(12) United States Patent
Hagiwara

(10) Patent No.: US 6,829,030 B2
(45) Date of Patent: *Dec. 7, 2004

(54) ELECTRO-OPTIC DEVICE AND ELECTRONIC APPARATUS

(75) Inventor: Takeshi Hagiwara, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,581

(22) Filed: Aug. 26, 2003

(65) Prior Publication Data

US 2004/0105064 A1 Jun. 3, 2004

Related U.S. Application Data

(62) Division of application No. 09/881,655, filed on Jun. 14, 2001, now Pat. No. 6,665,037.

(30) Foreign Application Priority Data

Jun. 15, 2000 (JP) ........................................ 2000-179905
May 8, 2001 (JP) ........................................ 2001-137492

(51) Int. Cl.[7] ...................... G02F 1/1343; G02F 1/1345
(52) U.S. Cl. ...................... 349/149; 349/139; 349/143; 349/147; 349/148; 349/150; 438/30
(58) Field of Search ................................ 349/139, 143, 349/147–150; 257/72; 438/30

(56) References Cited

U.S. PATENT DOCUMENTS

| | | | |
|---|---|---|---|
| 5,717,475 A | * 2/1998 | Kamio et al. | 349/147 |
| 6,052,169 A | * 4/2000 | Kim | 349/148 |
| 6,133,978 A | * 10/2000 | Tajima | 349/150 |
| 6,456,279 B1 | 9/2002 | Kubo et al. | |
| 6,665,037 B2 | * 12/2003 | Hagiwara | 349/148 |
| 2001/0033264 A1 | 10/2001 | Ishii | |

FOREIGN PATENT DOCUMENTS

| | | | |
|---|---|---|---|
| JP | 53-49964 | 5/1978 | |
| JP | 57-101883 | 6/1982 | |
| JP | 361059 | 3/1986 | |
| JP | 61059425 A | * 3/1986 | ........... G02F/1/133 |
| JP | 62-196626 | 8/1987 | |
| JP | 02-287433 | 11/1990 | |
| JP | 03-167527 | 7/1991 | |
| JP | 11-288001 | 10/1999 | |
| JP | 2000-56294 | 2/2000 | |
| KR | 2000-0015775 | 3/2000 | |
| KR | 2000-0030026 | 5/2000 | |
| WO | WO00/28373 | 5/2000 | |

OTHER PUBLICATIONS

Examination report from corresponding Korean application.
Communication from Japan re: counterpart application.
Patent Abstracts of Japan 2000–056294.
Patent Abstracts of Japan 11–288001.
Communication from Japan Patent Office re: counterpart application.

* cited by examiner

*Primary Examiner*—Huyen Ngo
(74) *Attorney, Agent, or Firm*—Harness, Dickey & Pierce, P.L.C.

(57) ABSTRACT

In an electro-optic device 1, connection to first electrodes 40 of a first transparent substrate 10 extending in one direction from the side, to which signals are inputted, is established through electrical conduction between two substrates in a width-wise central area of the first transparent substrate using first terminals 81. To second electrodes 50 of a second transparent substrate 20 which are routed toward the outer side, signals are directly inputted from second terminals 82. The obliquely routed second electrodes 50 are formed of, e.g., an aluminum alloy film, and slit-like openings are formed in the second electrodes 50 to allow passage of light emitted from a backlight device 9.

14 Claims, 25 Drawing Sheets

(A)

(B)

(C)

ELECTRO-OPTIC DEVICE AND ELECTRONIC APPARATUS

CROSS REFERENCE TO RELATED APPLICATIONS

This is a divisional of U.S. patent application Ser. No. 09/881,655 filed Jun. 14, 2001 now U.S. Pat. No. 6,665,037.

BACKGROUND OF THE INVENTION

1. Technical Field of the Invention

The present invention relates to an electro-optic device having an electro-optic substance held between a pair of substrates, and an electronic apparatus employing the electro-optic device. More specifically, the present invention relates to the structure of electrodes and terminals in each of the substrates constituting the electro-optic device.

2. Description of the Related Art

Of various types of electro-optic devices, one (liquid crystal device) utilizing a liquid crystal as an electro-optic substance comprises, as shown in FIG. 21, a first transparent substrate 10Z and a second transparent substrate 20Z arranged in an opposed relation, a sealing material 30 for bonding both the substrates to each other, and a liquid crystal sealed in an area surrounded by the first transparent substrate 10Z, the second transparent substrate 20Z and the sealing material 30. In a state of the first transparent substrate 10Z and the second transparent substrate 20Z being bonded to each other in an opposed relation, the first transparent substrate 10Z has a portion 25' extending out of an edge of the second transparent substrate 20Z, and the second transparent substrate 20Z has a portion 25" extending out of an edge of the first transparent substrate 10Z.

A plurality of first electrodes 40Z are formed on a surface of the first transparent substrate 10Z opposing to the second transparent substrate 20Z. The first electrodes 40Z are formed to extend up to the extended portion 25' of the first transparent substrate 10Z for connection to a driving IC 7Z' mounted in the extended portion 25'. On the other hand, a plurality of second electrodes 50Z are formed on a surface of the second transparent substrate 20Z opposing to the first transparent substrate 10Z in a crossed relation to the first electrodes 40Z. The second electrodes 50Z are formed to extend up to the extended portion 25" of the second transparent substrate 20Z for connection to a driving IC 7Z" mounted in the extended portion 25". Thus, output signals from the driving IC 7Z' are supplied to the first electrodes 40Z, and output signals from the driving IC 7Z" are supplied to the second electrodes 50Z.

However, such a construction has the problem that the size of the electro-optic device is increased because the first transparent substrate 10Z and the second transparent substrate 20Z have the extended portions 25', 25".

To overcome the above problem, there has been proposed an electro-optic device of the type that permits signals to be inputted from one substrate to the other substrate by utilizing electrical conduction between both the substrates. This electrical conduction between both the substrates is established as shown in FIGS. 22 and 23. When a first transparent substrate 10Z and a second transparent substrate 20Z are bonded to each other, inter-substrate conducting terminal portions 60Z constituted by ends of the first electrodes 40Z formed on the first transparent substrate 10Z and end portions 70Z of terminals formed on the second transparent substrate 20Z are placed in an opposed relation. In this condition, the sealing material 30 is hardened while applying forces to narrow a gap between the inter-substrate conducting terminal portions 60Z and the terminal end portions 70Z so that conductive particles 31 dispersed in the sealing material 30 are collapsed between the first transparent substrate 10Z and the second transparent substrate 20Z. As a result, the conductive particles 31 present between the inter-substrate conducting terminal portions 60Z and the terminal end portions 70Z establish electrical conduction between them, while the other conductive particles 31 present in other areas than the areas, in which the inter-substrate conducting terminal portions 60Z and the terminal end portions 70Z are opposed to each other, are not collapsed and do not take part in the electrical conduction between them. Therefore, only the inter-substrate conducting terminal portions 60Z and the terminal end portions 70Z are electrically conducted to each other.

As described below in connection with FIG. 23, the size of the electro-optic device can be reduced by utilizing the electrical conduction thus established between both the substrates. Referring to FIG. 23, the second transparent substrate 20Z is formed to be greater than the first transparent substrate 10Z, and the second transparent substrate 20Z has a portion 25Z extending out of an edge of the first transparent substrate 10Z. In the extended portion 25Z, a driving IC 7 is mounted for supplying predetermined signals to first electrodes 40Z of the first transparent substrate 10Z and second electrodes 50Z of the second transparent substrate 20Z. By utilizing the electrical conduction, described above with reference to FIG. 22, in a region circumscribed by a circle C in FIG. 23, output terminals of the driving IC 7Z mounted on the second transparent substrate 20Z are connected to the first electrodes 40Z of the first transparent substrate 10Z as well through the electrical conduction between both the substrates.

Employing such a construction reduces the size of the electro-optic device as compared with the electro-optic device shown in FIG. 21 because only the one extended portion 25' is needed.

Further, even in an electro-optic device not employing the COG mounting, it is only necessary to connect a flexible board to one extended portion as shown in FIGS. 24 to 29.

FIGS. 24 and 25 are respectively a perspective view and an exploded perspective view of a conventional electro-optic device. FIG. 26 is a sectional view of one end of the electro-optic device on the side indicated by XIV' when sectioned along line XIV–XIV' in FIG. 24. FIG. 27 is a plan view showing, in enlarged scale, electrodes and terminals formed on a first transparent substrate of the electro-optic device shown in FIGS. 24, 25 and 26, and FIG. 28 is a plan view showing, in enlarged scale, electrodes and terminals formed on a second transparent substrate of the electro-optic device shown in FIG. 25. FIG. 29 is a plan view showing, in enlarged scale, the electrodes and the terminals in a state where the first transparent substrate shown in FIG. 27 and the second transparent substrate shown in FIG. 28 are bonded to each other.

The electro-optic device shown in those drawings is also a liquid crystal device of passive matrix type. As schematically shown in FIGS. 24, 25 and 26, a pair of substrates each being made of a rectangular glass, for example, are bonded to each other by a sealing material 30 with a predetermined gap left therebetween, and a liquid crystal sealed-in space 35 is defined by the sealing material 30 between both the substrates. A liquid crystal as an electro-optic substance is sealed in the liquid crystal sealed-in space 35 to form a liquid crystal layer 4 (electro-optic layer), and an inner area of the liquid crystal sealed-in space 35 serves as an image display area 2. In this description, of the pair of substrates, one provided with first electrodes 40X (pixel addressing electrodes) including drive portions 41X formed thereon to extend over the image display area 2 in the direction of length is assumed to be a first transparent substrate 10X, and the other provided with second electrodes 50Y (pixel addressing electrodes) including drive portions 51Y formed thereon to extend over the image display area 2 in the direction of width is assumed to be a second transparent substrate 20Y.

On the second transparent substrate 20Y, as shown in FIG. 26, sets of color filters 7R, 7G and 7B of red (R), green (G) and blue (B) are formed in areas corresponding to points at which the first electrodes 40X intersect the second electrodes 50Y. An insulating flattening film 21, the second electrodes 50Y and an alignment film 22 are formed in this order on the surface side of the color filters 7R, 7G and 7B. In the first transparent substrate 10X, an alignment film 12 is formed on the surface side of the first electrodes 40X.

This electro-optic device 1X is of the transmissive type, and the first electrodes 40X and the second electrodes 50Y are each formed of an ITO film (Indium Tin Oxide/transparent conductive film). In the electro-optic device 1X, a polarizing plate 62 is affixed to an outer surface of the second transparent substrate 20Y, and a polarizing plate 61 is affixed to an outer surface of the first transparent substrate 10X. Further, a backlight device 9 is disposed outside the first transparent substrate 10X.

In the transmissive electro-optic device 1X having the above-described construction, the light emitted from the backlight device 9 enters the first transparent substrate 10X and then exits from the side of the second transparent substrate 20Y after being modulated by the liquid crystal layer 4.

In the electro-optic device 1X, as shown in FIGS. 24 and 25, inputting of signals from the exterior and electrical conduction between both the substrates are made using areas near respective one sides 101X, 201Y of the first transparent substrate 10X and the second transparent substrate 20Y, which are located in the same direction. To this end, a portion of the first transparent substrate 10X near the side 101X thereof is extended out of an edge of the second transparent substrate 20Y to form an extended portion 15X, and a flexible board 90 including a driving IC 7X mounted thereon is connected to the extended portion 15X. Also, an area of the first transparent substrate 10X, on which the side 201Y of the second transparent substrate 20Y lies, is used to establish the electrical conduction with the second transparent substrate 20Y.

To realize such a construction, as shown in FIGS. 25 and 27, a plurality of first terminals 81X are formed in opposite outer areas of the first transparent substrate 1ox in the longitudinal direction of the side 101X thereof, and a plurality of second terminals 82X are formed in a central area of the first transparent substrate 10X in the same longitudinal direction.

In the first transparent substrate 10X, the second terminals 82X are constituted by ends of the first electrodes 40X. The first electrodes 40X comprise wiring portions 42X extending straight from the second terminals 82X toward a side 102X of the first transparent substrate 10X opposing to the side 101X (i.e., toward the image display area 2) and then extending obliquely outward, and drive portions 41X extending straight from the wiring portions 42X toward the opposing side 102X of the first transparent substrate 10X.

Herein, the first electrodes 40X and the first terminals 81X are formed of an ITO film.

On the other hand, as shown in FIGS. 25 and 28, the second electrodes 50Y formed on the second transparent substrate 20Y comprise drive portions 51Y, wiring portions 52Y leading from the drive portions 51Y, and inter-substrate conducting terminal portions 70Y formed at ends of the wiring portions 52Y. The inter-substrate conducting terminal portions 70Y are formed to lie side by side along the side 201Y of the second transparent substrate 20Y. Herein, the second electrodes 50X are formed of an ITO film.

On the second transparent substrate 20Y, the wiring portions 52Y are routed so as to bypass an area overlapping the wiring portions 42X of the first electrodes 40X formed on the first transparent substrate 10X when viewed from above, passing through areas located on both sides of that overlapping area. Therefore, the inter-substrate conducting terminal portions 70Y are shaped such that they are linearly formed in a central region of the side 201Y of the second transparent substrate 20Y, but a proportion of an obliquely extending zone (inclined zone 702Y) in each entire terminal portion 70Y is increased as they extend toward the left and right farther away from the central region of the side 210Y.

Unlike the normal wiring portions, the inter-substrate conducting terminal portions 70Y establish the electrical conduction with ends 60X of the second terminal 82X through conductive particles held between both the substrates, and are hence more likely to cause a short-circuiting between the adjacent terminals. To surely prevent a short-circuiting between those terminals, it is necessary to secure a sufficiently wide spacing between the adjacent terminals. For this reason, those of the inter-substrate conducting terminal portions 70Y, which are located close to the opposite ends of the side 201Y of the second transparent substrate 20Y, are formed to have straight zones 701Y with lengths differing to a relatively large extent between the adjacent terminal portions 70Y, so that a relatively wide spacing is ensured between the adjacent inclined zones 702Y obliquely extending from the straight zones 701Y. Therefore, an angle α formed by a line E connecting the boundaries of the straight zones 701Y and the inclined zones 702Y of the inter-substrate conducting terminal portions 70Y with respect to the side 201Y of the second transparent substrate 20Y is fairly large.

On the other hand, those of the inter-substrate conducting terminal portions 70Y, which are located in a region closer to the center of the side 201Y of the second transparent substrate 20Y, are extended straight thoroughly. Zones obliquely extending from ends of the inter-substrate conducting terminal portions 70Y constitute the wiring portions 52Y that do not take part in establishing the electrical conduction between both the substrates through conductive particles. In the wiring portions 52Y, therefore, the spacing between adjacent patterns can be fairly narrowed. Thus, in the region closer to the center of the side 201Y of the second transparent substrate 50Y, an angle formed by a line connecting the boundaries between straight zones 501Y and inclined zones 502Y of the inter-substrate conducting terminal portions 70Y with respect to the side 201Y of the second transparent substrate 20Y is fairly small.

When constructing the electro-optic device 1X using the first transparent substrate 10X and the second transparent substrate 20Y which have the above-described construction, in the step of bonding the first transparent substrate 10X and the second transparent substrate 20Y through a sealing material 30 as shown in FIGS. 25 and 29, a gap material and conductive particles are mixed in the sealing material 30, and the sealing material 30 is further applied to an area in which the ends 60X of the first terminals 81X and the inter-substrate conducting terminal portions 70Y are positioned to lie one above the other. By bonding the first transparent substrate 10X and the second transparent substrate 20Y through the sealing material 30, therefore, the ends 60X of the first terminals 81X and the inter-substrate conducting terminal portions 70Y are electrically conducted with each other through the conductive particles. Also, as a result of bonding the first transparent substrate 10X and the second transparent substrate 20Y, pixels 5 are formed in a matrix pattern by points at which the drive portions 41X of the first electrodes 40X intersect the drive portions 51Y of the second electrodes 50Y.

Accordingly, by mounting the flexible board 90 to the first terminals 81X and the second terminals 82X, which are formed on the first transparent substrate 10X along the side 101X thereof, with the aid of an anisotropic conductive material or the like, and then inputting signals to the first terminals 81X and the second terminals 82X through the flexible board 90, image data signals can be directly applied from the second terminals 82X to the first electrodes 40X formed on the first transparent substrate lox, and scan signals can be applied to the second electrodes 50Y formed on the second transparent substrate 20Y through the first terminals 81X, the conductive particles and the inter-substrate conducting terminal portions 70Y.

However, since the electrical conduction between both the substrates is conventionally established using the inter-substrate conducting terminal portions 70Y having the obliquely extending zones, there arises a problem that a sufficient spacing between the inclined zones 702Y of the adjacent terminal portions 70Y must be ensured by forming the straight zones 701Y to have lengths differing from each other to a relatively large extent, thus resulting in wasteful use of an area that is positioned outside the image display area 2 and includes the inter-substrate conducting terminal portions 70Y. In the conventional electrode structure, if the number of the second electrodes 50Y is further increased in a region (having a region width indicated by arrow B) where patterns must be obliquely formed between a corner portion of an innermost one of the first electrodes 40X formed on the first transparent substrate 10X, which is bent near a corresponding corner of the image display area 2, and a base end portion of an outermost one of the first terminals 81X, the wiring portions 52Y of the second electrodes 50Y are overlapped with the wiring portions 42X of the first electrodes 40X in an area 250 shown in FIG. 29. This results in a higher probability that a short-circuiting may occur between both the substrates. Also, if the spacing between the inclined zones 702Y of the inter-substrate conducting terminal portions 70Y is narrowed to create an area allowing addition of the second electrodes 50Y with the view of increasing the number of the second electrodes 50Y, this try increases a probability that a short-circuiting may occur between the adjacent terminals. Further, if a solution of reducing, e.g., the line width of the inter-substrate conducting terminal portion 70Y and/or the wiring portion 52Y of each second electrode 50Y is tried to forcibly create such an area allowing addition of the second electrodes 50Y by narrowing the region width B, electrical resistance in those portions is increased and therefore display quality deteriorates.

In view of the above-described problems, an object of the present invention is to provide an electro-optic device of a type that permits signals inputted through external input terminals formed on one substrate to be inputted to the other substrate through electrical conduction between both the substrates, the device being constructed to be able to increase the number of electrodes through proper design of a wiring structure and wire material without deteriorating reliability and display quality.

Another object of the present invention is to provide an electro-optic device in which restrictions upon materials of conductive films constituting electrodes are alleviated without deteriorating display quality based on combination of the principles of both the transmissive type and the reflective type.

Still another object of the present invention is to provide an electronic apparatus employing such an electro-optic device.

SUMMARY OF THE INVENTION

To solve the problems described above, according to the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; and a first terminal formed on the second substrate and connected to the first electrode, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate such that the second terminal is located on the outer side relative to the first terminal.

Also, according to the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; and a first terminal formed on the second substrate and connected to the first electrode, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate such that the first terminal is located closer to the center than the second terminal.

Further, according to the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; and a first terminal formed on the second substrate and connected to the first electrode, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate such that the second terminal is located on the outer side relative to the first terminal, the second electrode being made of at least a material having lower electrical resistance than that of the first electrode.

Still further, according to the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and an extended portion of the second substrate extending out of an edge of the first substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being disposed in at least the extended portion, the first and second terminals being arranged to lie side by side along one side of the second substrate such that the second terminal is located on the outer side relative to the first terminal.

Still further, according to the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; and a first terminal formed on the second substrate and connected to the first electrode, the first electrode including a drive portion for applying an electric field to the electro-optic layer and an inter-substrate conducting terminal portion connected to the drive portion and the first terminal, the second electrode including a drive portion for applying an electric field to the electro-optic layer, a second terminal connected to the drive portion, and a wiring portion for connecting the drive portion and the second terminal, the wiring portion of the second electrode being located on the outer side relative to the first terminal in a direction along one side of the second substrate.

In the electro-optic device of the present invention, the first electrode extending simply in the direction of length from one side of the first substrate, to which a signal is inputted, toward the other opposing side thereof is connected through electrical conduction between the first substrate and the second substrate. To the second electrode which is routed toward the outer side to bypass the first electrode and is extended in the direction of width, a signal is directly inputted from the second terminal (external input terminal). Unlike the conventional wiring structure wherein a signal is directly inputted from an external input terminal to the first electrode extending simply in the direction of length from one side of the first substrate, to which a signal is inputted, toward the other opposing side thereof and a signal is inputted through an obliquely extending inter-substrate conducting terminal portion to the second electrode which is routed toward the outer side to bypass the first electrode and is extended in the direction of width, therefore, there is no need of utilizing the electrical conduction between both the substrates in a region where patterns must be obliquely extended. Thus, in the region where patterns must be obliquely extended, it is only necessary to form the second electrode which can be formed with a reduced distance between the patterns. Accordingly, the necessity of reducing the spacing between the inter-substrate conducting terminal portions is eliminated even when the number of patterns is increased in the region where the patterns must be obliquely extended. With the present invention, therefore, reliability in the region of the electrical conduction between both the substrates does not deteriorate even in cases where the number of electrodes is increased.

Also, the second electrode, which is subjected to such a restriction on electrode layout that patterns must be obliquely extended, is formed of, e.g., a metallic film having smaller electrical resistance than an ITO film. With this feature, electrical characteristics are kept from deteriorating regardless of a reduction in the line width of the wiring portion of the second electrode, which does not take part in constituting pixels. Accordingly, the present invention can prevent display quality from degrading due to deterioration of the electrical characteristics even when the number of electrodes is increased. Conversely speaking, given the number of patterns being the same, the region of the second substrate, in which patterns must be obliquely extended, can be made narrower than required in the conventional construction. In the electro-optic device having the same outer dimensions, it is possible to enlarge an image display area. Further, since the region of the second substrate, in which patterns must be obliquely extended, can be made narrower than required in the conventional construction, it is possible to reduce the outer dimensions of the electro-optic device having an image display area that is the same size as in conventional devices.

In the present invention, the electro-optic device may be constructed such that the second terminal is located on both sides of the first terminal in the direction along the one side of the second substrate, or that the second terminal is located on one side of the first terminal in the direction along the one side of the second substrate.

In the present invention, the inter-substrate conducting terminal portion of the first electrode and the first terminal are electrically connected to each other, for example, by an electrically conducting material held between the first substrate and the second substrate. The electrically conducting material contains a resin held between the first substrate and the second substrate, and conductive particles dispersed in the resin. When the electro-optic device further comprises a sealing material disposed between the first substrate and the second substrate so as to surround the electro-optic layer, the electrically conducting material includes the sealing material and conductive particles dispersed in the sealing material.

In the present invention, when the second electrode includes a wiring portion for connecting the drive portion and the second terminal, the wiring portion is preferably located on the outer side relative to the first terminal in the direction along the one side of the second substrate.

In the present invention, preferably, the inter-substrate conducting terminal portion of the first electrode is connected to an end of the first terminal, and the wiring portion of the second electrode includes a zone arranged obliquely relative to the end of the first terminal.

In the present invention, preferably, the wiring portion of the second electrode is arranged so as to bend around a lateral region of the first terminal.

In the present invention, when the first electrode is provided in plural number and the second electrode is provided in plural number, the number of the first electrodes is preferably larger than the number of the second electrodes.

In the present invention, preferably, an image data signal is supplied to the first electrode, and a scan signal is supplied to the second electrode. With this feature of reducing electrical resistance of the electrode to which a scan signal is supplied, image quality can be improved correspondingly.

In the present invention, the first electrode may be formed of at least a transparent conductive film, and the second electrode may be formed of at least a metallic film. For example, the first electrode may be formed of at least an ITO film, and the second electrode is formed of at least a material selected from the group consisting of aluminum, silver, an aluminum alloy, and a silver alloy.

In the present invention, the second electrode has an opening formed therein to allow passage of light entering from the side of the second substrate. In this case, the opening is, e.g., a slit- or window-like opening. With this construction, since the second electrode is formed of a metallic film and is capable of reflecting light, the light incident upon the first substrate is reflected by the second electrode and then exits from the side of the first substrate after being modulated by an electro-optic substance. Accordingly, the electro-optic device of the present invention functions in the first place as a reflective display device. Further, since the opening is formed in the second electrode, the light emitted from a backlight device and entering the second substrate passes through the opening of the second electrode and then exits from the side of the first substrate after being modulated by the electro-optic substance such as a liquid crystal. Accordingly, the electro-optic device of the present invention further functions as a transmissive display device. As a result, display quality is kept from degrading even when the light transmittance of the second electrode is reduced by using, as a material of the second electrode, a metallic film having small electrical resistance, such as an aluminum film, an alloy film made of primarily aluminum, a silver film, or a silver alloy film made of primarily silver.

In the present invention, the electro-optic layer is a liquid crystal layer.

The electro-optic device according to the present invention can reduce the size of a non-display area or increase the number of pixels without deteriorating the reliability. Therefore, the electro-optic device is preferably used as a display unit of an electronic apparatus, in particular, a small-sized one.

The present invention is applicable to not only an electro-optic device wherein, for example, a flexible board including a driving IC mounted thereon by the COF (Chip On Flexible Tape), TCP (Tape Carrier Package) or TAB (Tape Automated Bonding) technique, is connected to the second substrate, but also an electro-optic device wherein a driving IC is connected to the second substrate by the COG (Chip On Glass) technique.

More specifically, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and a driving IC mounted on the second substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate and connected to the driving IC, the second terminal being located on the outer side relative to the first terminal.

Also, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and a driving IC mounted on the second substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate and connected to the driving IC, the first terminal being located closer to the center than the second terminal.

Further, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and a plurality of driving ICs mounted on the second substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate and connected respectively to the corresponding driving ICs, the second terminal being located on the outer side relative to the first terminal.

Still further, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and a driving IC mounted on the second substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being arranged to lie side by side along one side of the second substrate and connected to the driving IC, the second terminal being located on the outer side relative to the first terminal, the second electrode being made of at least a material having lower electrical resistance than that of the first electrode.

Still further, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; a driving IC mounted on the second substrate; and an extended portion of the second substrate extending out of an edge of the first substrate, the first electrode including a drive portion for applying an electric field to the electro-optic layer and an inter-substrate conducting terminal portion connected to the drive portion and the first terminal, the second electrode including a drive portion for applying an electric field to the electro-optic layer and a second terminal connected to the drive portion, the first and second terminals being disposed in at least the extended portion, the first and second terminals being arranged to lie side by side along one side of the second substrate and connected to the driving IC, the second terminal being located on the outer side relative to the first terminal.

Still further, according to another aspect of the present invention, in an electro-optic device comprising a first substrate and a second substrate arranged in an opposed relation, the device has the feature of comprising an electro-optic layer supported between the first substrate and the second substrate; a first electrode formed on the first substrate; a second electrode formed on the second substrate; a first terminal formed on the second substrate and connected to the first electrode; and a driving IC mounted on the second substrate, the first electrode including a drive portion for applying an electric field to the electro-optic layer and an inter-substrate conducting terminal portion connected to the drive portion and the first terminal, the second electrode including a drive portion for applying an electric field to the electro-optic layer, a second terminal connected to the drive portion, and a wiring portion for connecting the drive portion and the second terminal, the first and second terminals being connected to the driving IC, the wiring portion of the second electrode being located on the outer side relative to the first terminal in a direction along one side of the second substrate.

In the electro-optic device of the present invention, the first electrode extending simply in the direction of length from one side of the first substrate, on which the driving IC is mounted, toward the other opposing side thereof is connected through electrical conduction between the first substrate and the second substrate. To the second electrode which is routed toward the outer side to bypass the first electrode and is extended in the direction of width, a signal is directly supplied from the driving IC through the same substrate as that on which the driving IC is mounted. Therefore, there is no need of utilizing the electrical conduction between both the substrates in a region where patterns must be obliquely extended. Thus, in the region where patterns must be obliquely extended, it is only necessary to form the second electrode which can be formed with a reduced distance between the patterns. Accordingly, the necessity of reducing the spacing between the inter-substrate conducting terminal portions is eliminated even when the number of patterns is increased in the region where the patterns must be obliquely extended. With the present invention, therefore, reliability in the region of the electrical conduction between both the substrates does not deteriorate even in cases where the number of electrodes is increased.

Also, the second electrode, which is subjected to such a restriction on electrode layout that patterns must be obliquely extended, is formed of, e.g., a metallic film having smaller electrical resistance than an ITO film. With this feature, electrical characteristics are kept from deteriorating regardless of a reduction in the line width of the wiring portion of the second electrode, which does not take part in constituting pixels. Accordingly, the present invention can prevent display quality from degrading due to deterioration of the electrical characteristics even when the number of electrodes is increased. Conversely speaking, given the number of patterns being the same, the region of the second substrate, in which patterns must be obliquely extended, can be made narrower than required in the conventional construction. In the electro-optic device having the same outer dimensions, it is possible to enlarge an image display area. Further, since the region of the second substrate, in which patterns must be obliquely extended, can be made narrower than required in the conventional construction, it is possible to reduce the outer dimensions of the electro-optic device having an image display area that is the same size as in conventional devices. Additionally, the electro-optic device utilizing the COG mounting technique is more inexpensive than another one utilizing the COF or TAB mounting technique, and has higher reliability in resistance to peeling-off because it includes no connection to a flexible board such as a thin film or TAB carrier.

In the present invention, the electro-optic device may be constructed such that the second terminal is located on both sides of the first terminal in the direction along the one side of the second substrate, or that the second terminal is located on one side of the first terminal in the direction along the one side of the second substrate.

In the present invention, the inter-substrate conducting terminal portion of the first electrode and the first terminal are electrically connected to each other by an electrically conducting material held between the first substrate and the second substrate.

In the present invention, the electrically conducting material contains a resin held between the first substrate and the second substrate, and conductive particles dispersed in the resin.

In the present invention, when the electro-optic device further comprises a sealing material disposed between the first substrate and the second substrate so as to surround the electro-optic layer, the electrically conducting material may include the sealing material and conductive particles dispersed in the sealing material.

In the present invention, when the second electrode includes a wiring portion for connecting the drive portion and the second terminal, the wiring portion is located on the outer side relative to the first terminal in the direction along the one side of the second substrate.

In the present invention, the inter-substrate conducting terminal portion of the first electrode may be connected to an end of the first terminal, and the wiring portion of the second electrode may include a zone arranged obliquely relative to the end of the first terminal.

In the present invention, the wiring portion of the second electrode may be arranged so as to bend around a lateral region of the first terminal.

In the present invention, when the first electrode is provided in plural number and the second electrode is provided in plural number, the number of the first electrodes is preferably larger than the number of the second electrodes.

In the present invention, preferably, an image data signal is supplied to the first electrode, and a scan signal is supplied to the second electrode.

In the present invention, the first electrode may be formed of at least a transparent conductive film, and the second electrode may be formed of at least a metallic film.

In the present invention, the first electrode may be formed of at least an ITO film, and the second electrode may be formed of at least a material selected from the group consisting of aluminum, silver, an aluminum alloy, and a silver alloy.

In the present invention, the electro-optic layer is a liquid crystal layer.

The electro-optic device according to the present invention is employed as a display unit of an electronic apparatus.

DETAILED DESCRIPTION OF THE PREFERRED EMBODIMENTS

Embodiments of the present invention will be described with reference to the accompanying drawings.

Figure 1:
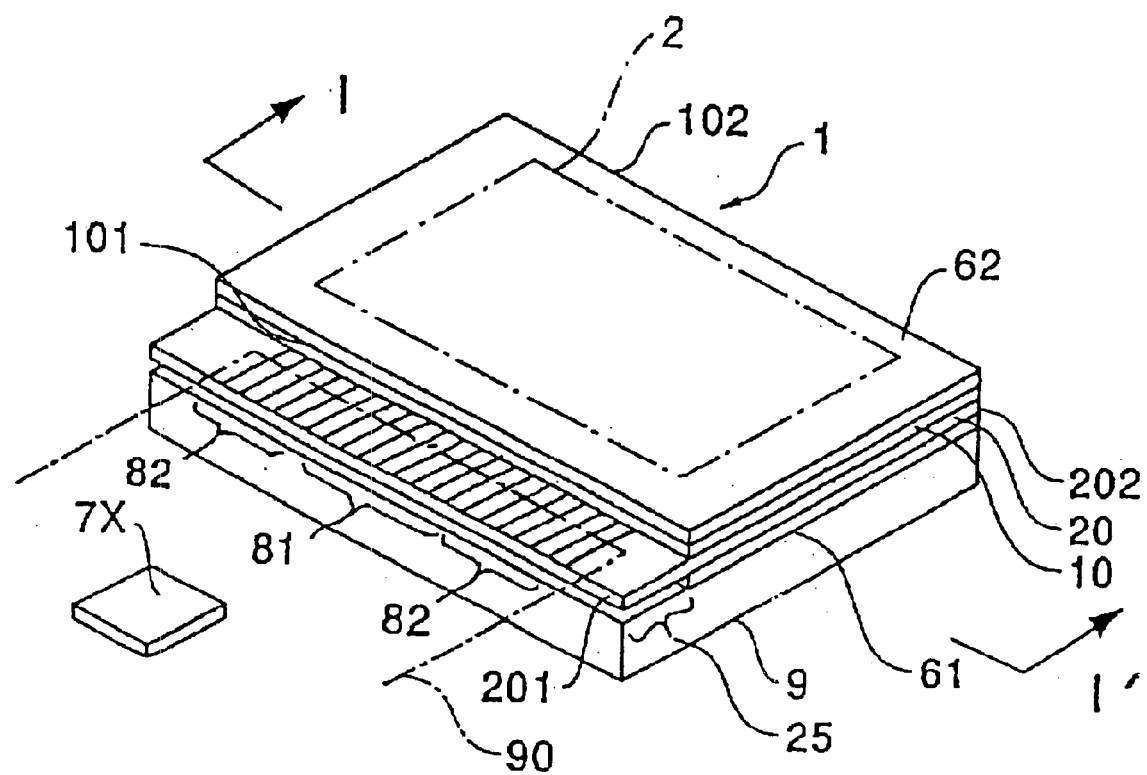
FIG. 1 is a perspective view of an electro-optic device according to Embodiment 1 of the present invention.
Figure 2:
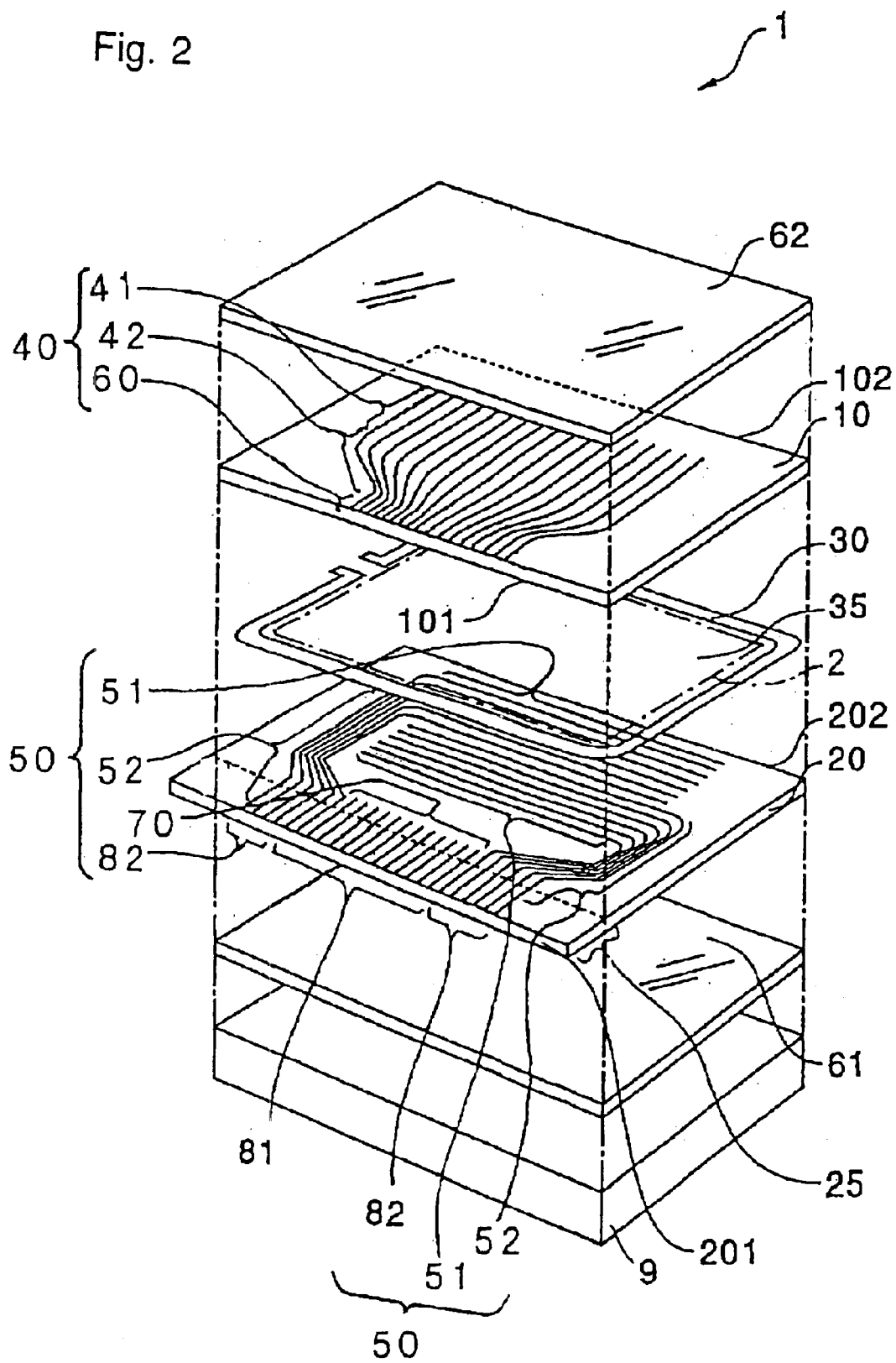
FIG. 2 is an exploded perspective view of the electro-optic device shown in FIG. 1.
Figure 3:
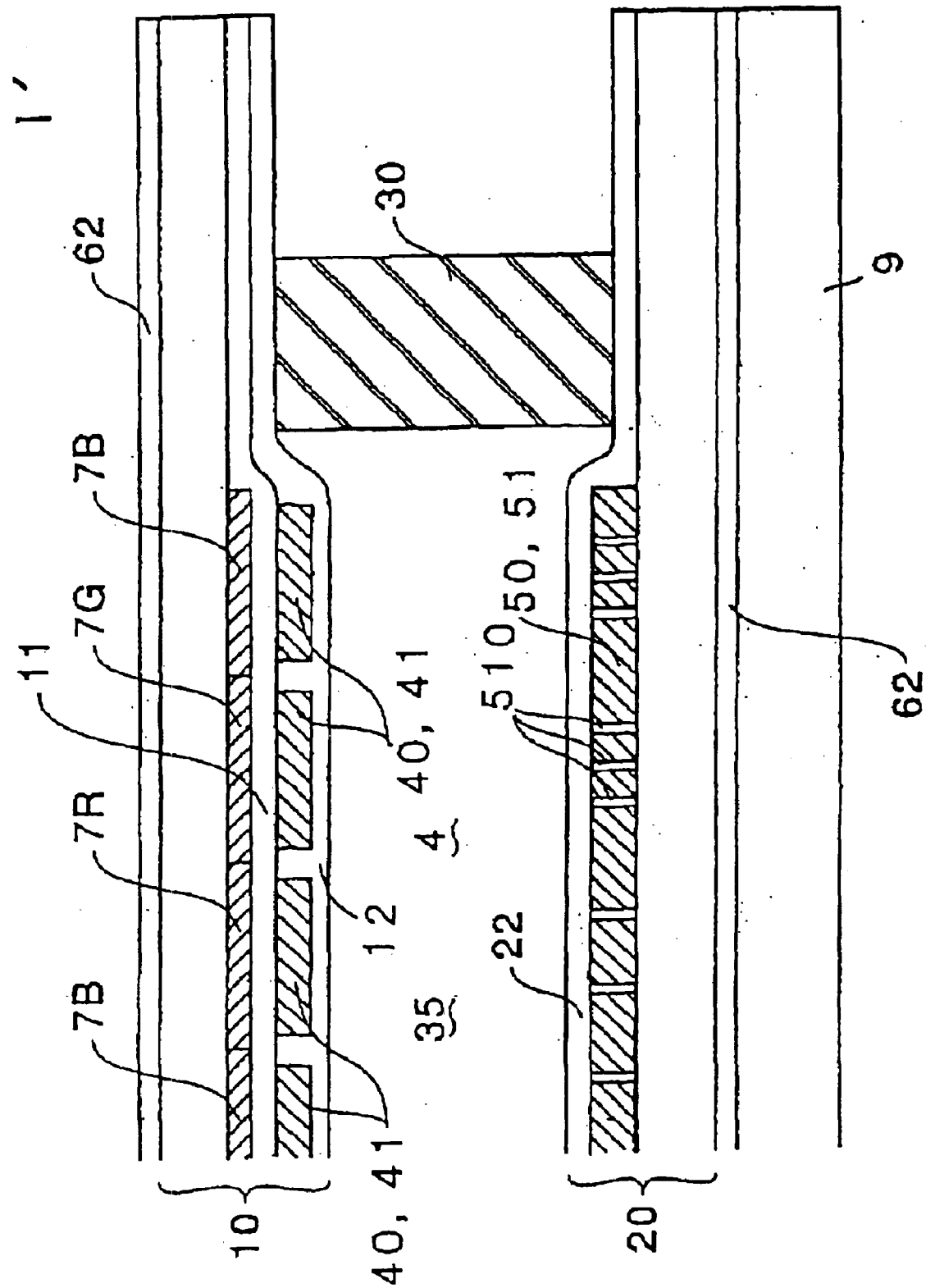
FIG. 3 is a sectional view of one end of the electro-optic device, shown in FIG. 1, on the side indicated by I' when sectioned along line I–I' in FIG. 1.
Figure 4:
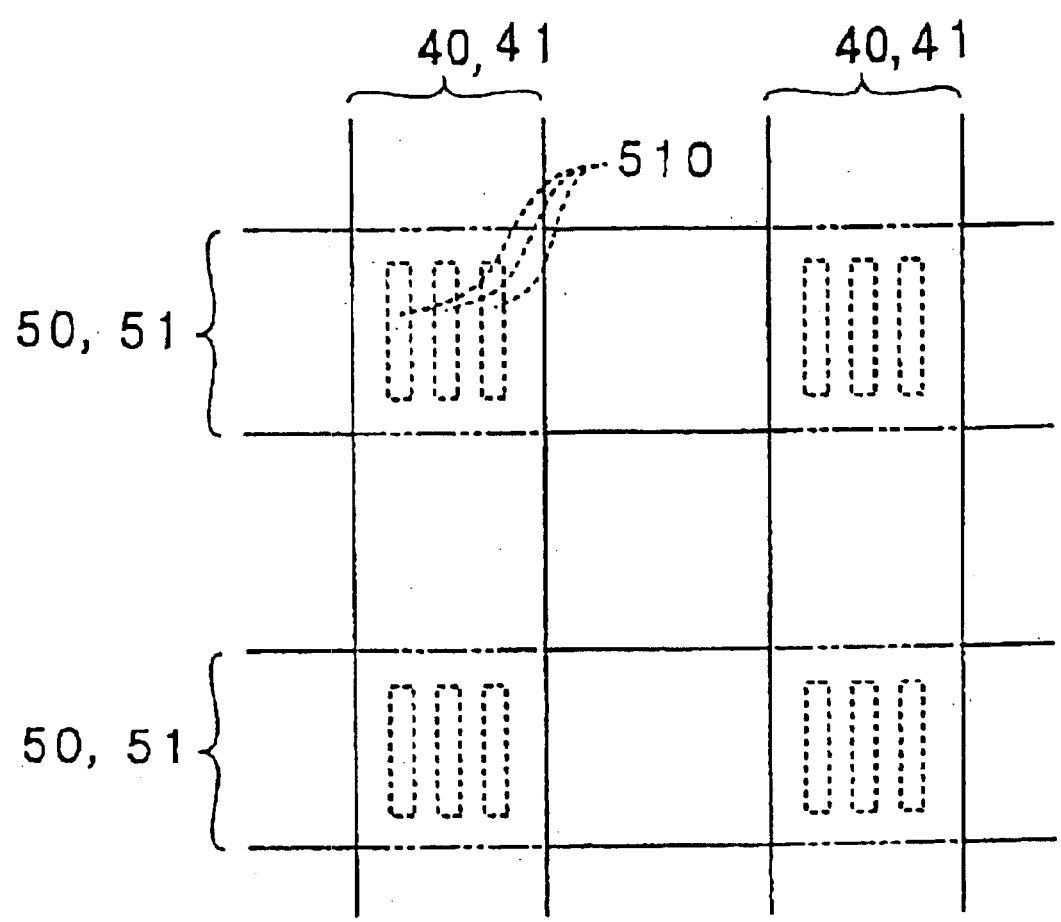
FIG. 4 is a plan view showing, in enlarged scale, crossed portions of electrodes in the electro-optic device shown in FIG. 1.
Figure 5:
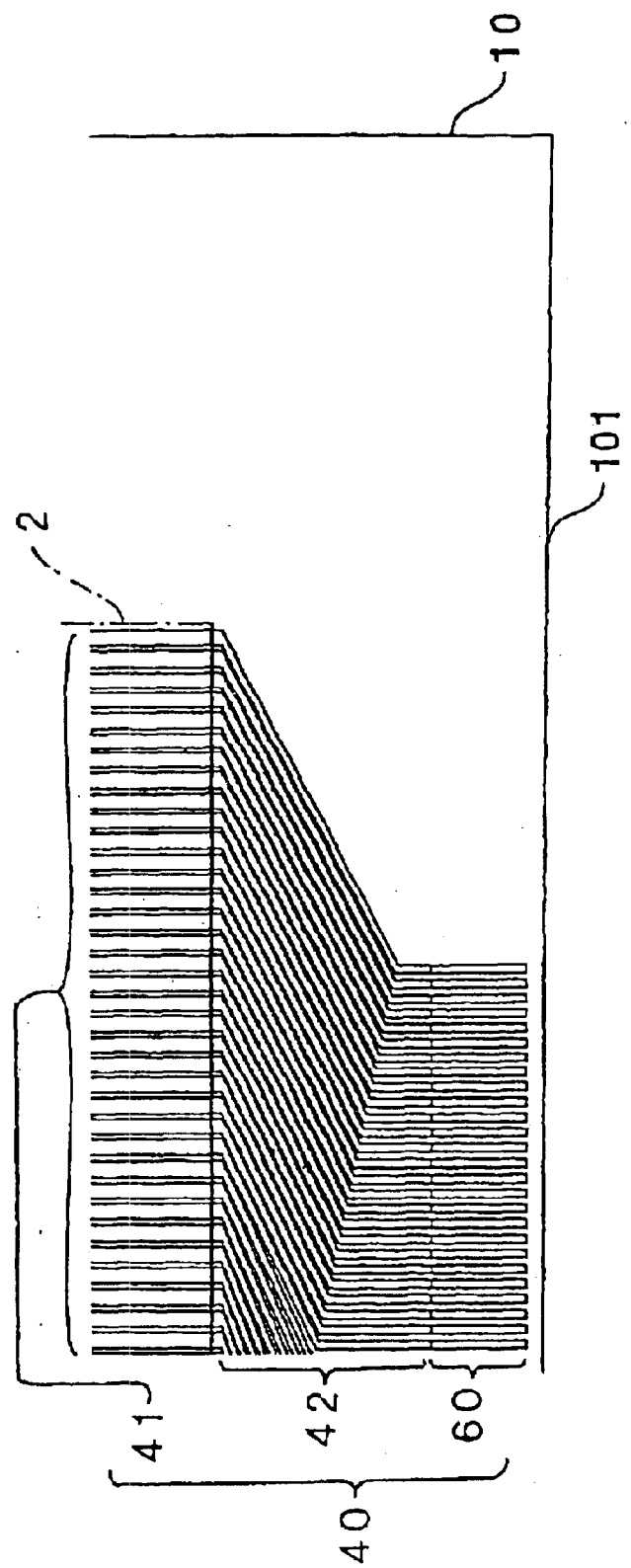
FIG. 5 is a plan view showing, in enlarged scale, first electrodes and terminals formed on a first transparent substrate of the electro-optic device shown in FIG. 1.
Figure 6:
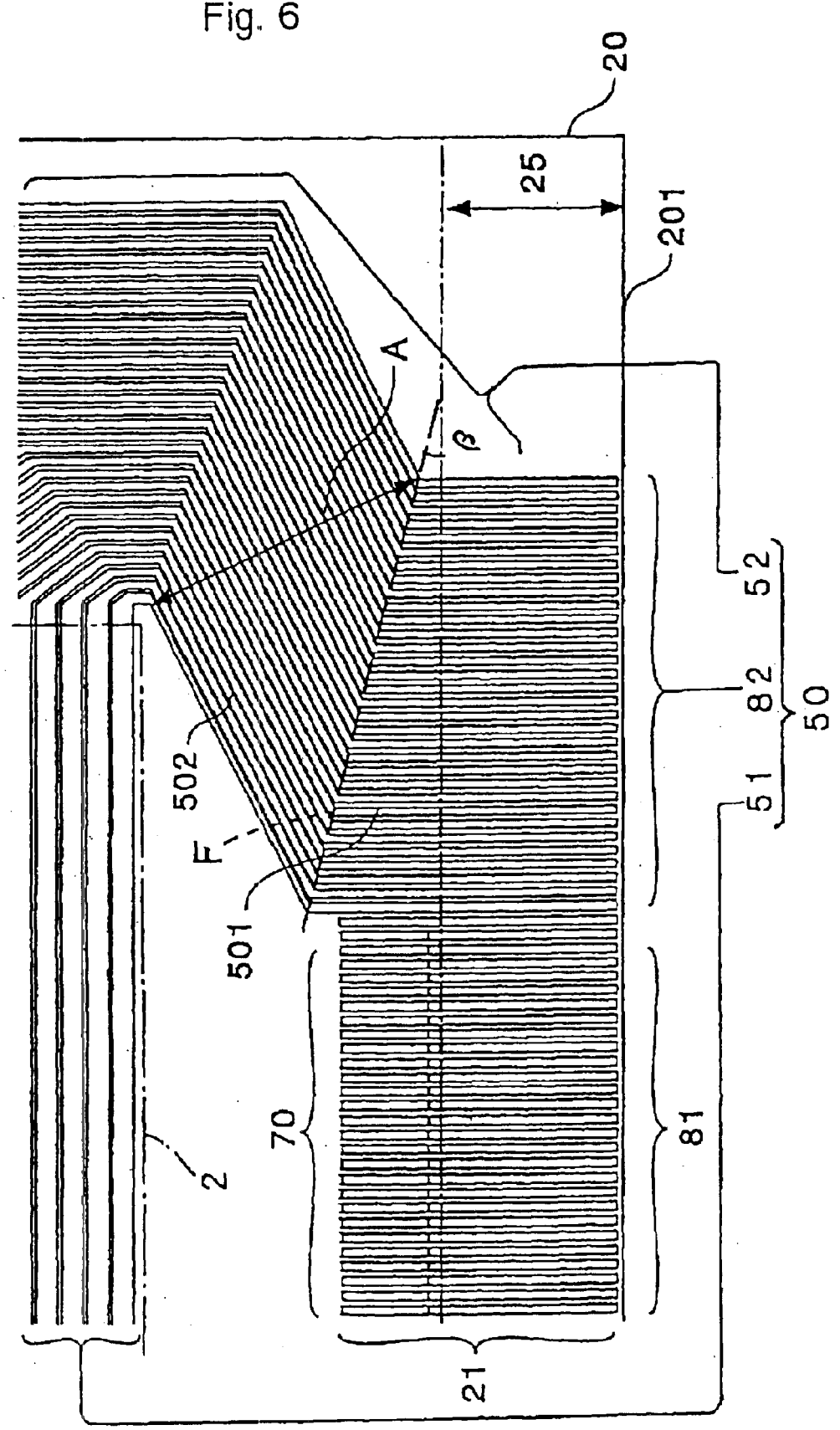
FIG. 6 is a plan view showing, in enlarged scale, second electrodes and terminals formed on a second transparent substrate of the electro-optic device shown in FIG. 1.
Figure 7:
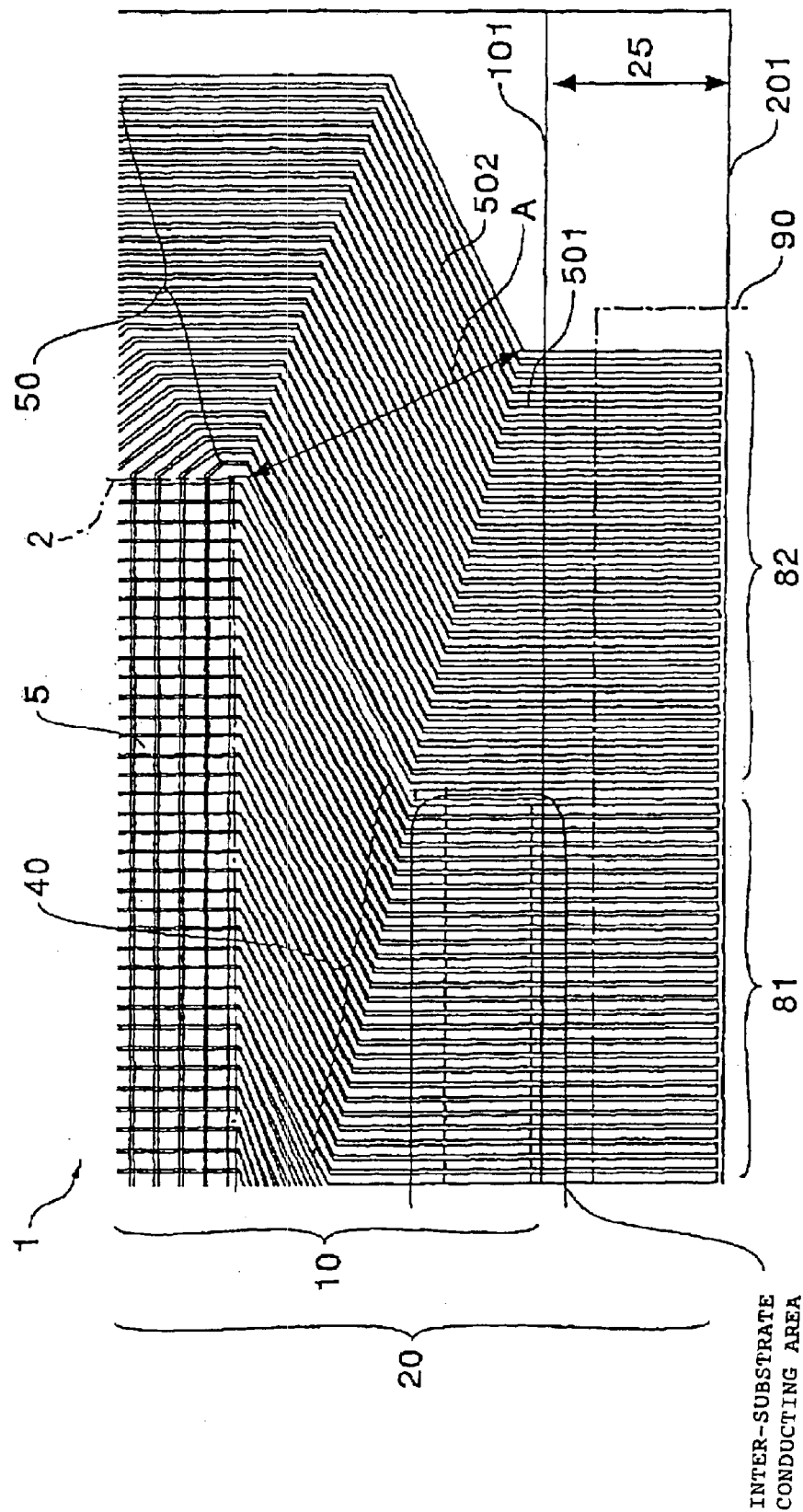
FIG. 7 is a plan view showing, in enlarged scale, the electrodes and the terminals in a state where the first transparent substrate shown in FIG. 5 and the second transparent substrate shown in FIG. 6 are bonded to each other.

FIGS. 1 and 2 are respectively a perspective view and an exploded perspective view of an electro-optic device to which the present invention is applied. FIG. 3 is a sectional view of one end of the electro-optic device on the side indicated by I' when sectioned along line I–I' in FIG. 1. FIG. 4 is a plan view showing, in enlarged scale, crossed portions of electrodes in the electro-optic device to which the present invention is applied. FIGS. 1 and 2 just schematically show electrodes and terminals, details of which will be described with reference to FIGS. 5, 6 and 7. FIGS. 5 and 6 are plan views showing respectively, in enlarged scale, first electrodes and terminals formed on a first transparent substrate and second electrodes and terminals formed on a second transparent substrate of the electro-optic device shown in FIGS. 1 and 2. FIG. 7 is a plan view showing, in enlarged scale, the electrodes and the terminals in a state where the first transparent substrate shown in FIG. 5 and the second transparent substrate shown in FIG. 6 are bonded to each other. Note that, in these drawings and other ones described later, various layers and members are depicted in different scales for allowing them to be recognized on the drawings.

Referring to FIGS. 1 and 2, an electro-optic device 1 of this embodiment is a liquid crystal display device of passive matrix type provided in electronic apparatuses such as a cellular phone. A pair of transparent substrates each being made of a rectangular glass, for example, are bonded to each other by a sealing material 30 with a predetermined gap left therebetween, and a liquid crystal sealed-in space 35 is defined by the sealing material 30 between both the substrates. A liquid crystal is sealed in the liquid crystal sealed-in space 35. An inner area of the liquid crystal sealed-in space 35, in which later-described pixels are arrayed in a matrix pattern, serves as an image display area 2. In the following description, of the pair of transparent substrates, one provided with plural columns of first electrodes 40 formed thereon to extend over the image display area 2 in the direction of length is assumed to be a first transparent substrate 10 (first substrate), and the other provided with plural rows of second electrodes 50 formed thereon to extend over the image display area 2 in the direction of width is assumed to be a second transparent substrate 20 (second substrate).

The electro-optic device 1 described herein is of the semi-transmissive and semi-reflective type. A polarizing plate 61 is affixed to an outer surface of the second transparent substrate 20, and a polarizing plate 62 is affixed to an outer surface of the first transparent substrate 10. Further, a backlight device 9 is disposed outside the second transparent substrate 20.

On the first transparent substrate 10, as with Embodiment 1 described above by referring to FIG. 3, sets of color filters 7R, 7G and 7B of red (R), green (G) and blue (B) are formed in areas corresponding to points at which the first electrodes 40 intersect the second electrodes 50. An insulating flattening film 11, the first electrodes 40 and an alignment film 12 are formed in this order on the surface side of the color filters 7R, 7G and 7B. On the second transparent substrate 20, the second electrodes 50 and an alignment film 22 are formed in this order.

In the electro-optic device 1, the first electrodes 40 are formed of an ITO film (transparent conductive film). On the other hand, the second electrodes 50 are formed of a metallic film (conductive film) capable of reflecting light, such as an aluminum film, an alloy film made of primarily aluminum, a silver film, or a silver alloy film made of primarily silver.

Also, in the electro-optic device 1 of this embodiment, as shown in FIG. 4, a plurality of narrow slit-like openings 510 are formed in each of portions of the second electrodes 50 in which they intersect the first electrodes 40 within the image display area 2. The openings 510 are not limited to the slit-like shape, but may be provided in the form of rectangular or circular windows.

In the electro-optic device 1 having the above-described construction, since the second electrodes 50 formed on the second transparent substrate 20 are formed of a metallic film capable of reflecting light, the light incident upon the first transparent substrate 10 is reflected by the second electrodes 50 and then exits from the side of the first transparent substrate 10 after being modulated by the liquid crystal layer 4. Accordingly, the electro-optic device 1 of this embodiment functions in the first place as a reflective display device. Further, since the slit-like openings 510 are formed in the second electrodes 50, the light emitted from the backlight device 9 and entering the second transparent substrate 20 passes through the openings 510 of the second electrodes 50 and then exits from the side of the first transparent substrate 10 after being modulated by the liquid crystal layer 4. Accordingly, the electro-optic device 1 of this embodiment further functions as a transmissive display device. Other than transparent conductive films such as an ITO film, the second electrodes 50 can be therefore formed of a metallic film having small electrical resistance, such as an aluminum film, an alloy film made of primarily aluminum, a silver film, or a silver alloy film made of primarily silver, so long as it is a conductive film capable of reflecting light. On the side of the second transparent substrate 20, therefore, wires and terminals (described later with reference to FIGS. 5, 6 and 7), which are formed at the same time as the second electrodes 50, can also be formed of a metallic film having small electrical resistance, such as an aluminum film, an alloy film made of primarily aluminum, a silver film, or a silver alloy film made of primarily silver, so that widths of their patterns are narrowed.

In the electro-optic device 1 of this embodiment, a ratio of the reflected light to the transmitted light can be changed by adjusting an opening percentage, e.g., the size of the slit-like openings 510. Since the electro-optic device 1 of this embodiment is of the semi-transmissive and semi-reflective type, the backlight device 9 is disposed on the rear side of the second transparent substrate 20 and the slit-like openings 510 are formed in the second electrodes 50 formed of a metallic film. When the electro-optic device 1 of this embodiment is constructed to be of the totally reflective type, the backlight device 9 disposed on the rear side of the second transparent substrate 20 may be omitted and the slit-like openings 510 formed in the second electrodes 50 are no longer needed. In this case, the second electrodes 50 are likewise formed of a metallic film such as an aluminum film, an alloy film made of primarily aluminum, a silver film, or a silver alloy film made of primarily silver. Additionally, when the electro-optic device 1 of this embodiment is constructed to be of the totally reflective type, the polarizing plate on the rear side of the substrate 20, which is an optical member required for the electro-optic device 1 to function as the transmissive type, is also no longer needed.

In the electro-optic device 1 constructed as described above, inputting of signals from the exterior and electrical conduction between both the substrates are made using areas near respective single sides 101, 201 of the first transparent substrate 10 and the second transparent substrate 20, which are located in the same direction. Accordingly, the second transparent substrate 20 is formed of a substrate having a larger size than the first transparent substrate 10. When the first transparent substrate 10 and the second transparent substrate 20 are bonded to each other, a portion of the second transparent substrate 20 is extended out of the side 101 of the first transparent substrate 10 to form an extended portion 25. A flexible board 90 (externally connecting board) including a driving IC 7 mounted thereon with the COF technology is connected by utilizing the extended portion 25.

Also, an area of the second transparent substrate 20, on which the side 101 of the first transparent substrate 10 lies, is used to establish the electrical conduction with the first transparent substrate 10.

To realize such a construction for the electrical connection in this embodiment, as shown in FIGS. 2 and 5, the first electrodes 40 formed on the first transparent substrate 10 comprise drive portions 41 extending straight over the image display area 2 in the direction of length, wiring portions 42 extending from the drive portions 41 toward a central region of the side 101 in a converging pattern, and inter-substrate conducting terminal portions 60 constituted by ends of the wiring portions 42. The inter-substrate conducting terminal portions 60 are formed to lie side by side at predetermined intervals along the side 101 of the first transparent substrate 10 in the central region thereof. Herein, the inter-substrate conducting terminal portions 60 are extended straight toward a side 102 of the first transparent substrate 10 opposing to the side 101. Also, the wiring portions 42 are extended from the side 101 of the first transparent substrate 10 toward the opposing side 102 while obliquely spreading to the left and right, and are then connected to the drive portions 41 extending over the image display area 2 in a direction perpendicular to the sides 101, 102 of the first transparent substrate 10. The first electrodes 40, including the drive portions 41, the wiring portions 42 and the inter-substrate conducting terminal portions 60, are entirely formed of ITO films.

On the second transparent substrate 20, as shown in FIGS. 2 and 6, first terminals 81 and second terminals 82 are formed along the side 201 thereof over a relatively wide range except for opposite ends of the side 201. The first terminals 81 are formed in a widthwise central area of the second transparent substrate 20 so as to lie side by side at predetermined intervals along the side 201 thereof. The second terminals 82 are formed in two opposite areas of the second transparent substrate 20, which are located outside the widthwise central area including the first terminals 81, so as to lie side by side at predetermined intervals along the side 201 thereof. The first terminals 81 and the second terminals 82 are each extended straight toward a side 202 (see FIG. 2) of the second transparent substrate 20 opposing to the side 201. The first terminals 81 have ends 70 which are positioned to lie under the inter-substrate conducting terminal portions 60 when the first transparent substrate 10 and the second transparent substrate 20 are bonded to each other.

The second terminals 82 are constituted to serve as ends of the second electrodes 50. More specifically, the second electrodes 50 comprise drive portions 51 extending straight over the image display area 2 in the direction of width, wiring portions 52 leading from the drive portions 51 and routed toward outer opposite regions of the side 201 of the second transparent substrate 20, and the second terminals 82 constituted by ends of the wiring portions 52. The wiring portions 52 are formed to extend in opposite lateral areas corresponding to both sides of the area, in which the first electrodes 40 are formed, when the first transparent substrate 10 and the second transparent substrate 20 are bonded to each other. The drive portions 51 are extended from the wiring portions 52 over the image display area 2 in a crossed relation to the first electrodes 40. Stated otherwise, the wiring portions 52 are obliquely extended to the left and right in the opposite lateral areas corresponding to both sides of the area in which the first electrodes 40 are formed, and are then bent so as to extend straight along the image display area 2 toward the opposing side 202 of the second transparent substrate 20. Thereafter, the wiring portions 52 are connected to the drive portions 51 extending parallel to the sides 201, 202 of the second transparent substrate 20 over the image display area 2.

As with the first terminals 81, the second electrodes 50 are each formed of a metallic film which is formed in a predetermined pattern and is capable of reflecting light, such as an aluminum film, an alloy film made of primarily aluminum, a silver film, or a silver alloy film made of primarily silver.

Further, the number of lines of the first electrodes 40 is larger than that of the second electrodes 50.

When constructing the electro-optic device 1 using the first transparent substrate 10 and the second transparent substrate 20 which have the above-described construction, in the step of bonding the first transparent substrate 10 and the second transparent substrate 20 through the sealing material 30, a gap material and conductive particles are mixed in the sealing material 30, and the sealing material 30 is further applied to the area in which the inter-substrate conducting terminal portions 60 and the ends 70 of the first terminals 81 are positioned to lie one above the other. Thus, the sealing material 30 functions also as a conductive material due to the conductive particles dispersed in an adhesive component that develops the sealing function. The conductive particles contained in the sealing material 30 are formed of, e.g., elastically deformable plastic beads having plated surfaces, and have a particle size slightly greater than that of the gap material which are also contained in the sealing material 30. Therefore, by placing the first transparent substrate 10 and the second transparent substrate 20 one above the other and then melting and hardening the sealing material 30 in this state while applying forces so as to narrow a gap between both the substrates, the conductive particles are collapsed between the first transparent substrate 10 and the second transparent substrate 20, whereby the inter-substrate conducting terminal portions 60 and the ends 70 of the first terminals 81 are electrically conducted with each other.

Further, as shown in FIG. 7, as a result of bonding the first transparent substrate 10 and the second transparent substrate 20 through the sealing material 30, pixels 5 are formed in a matrix pattern by points at which the first electrodes 40 intersect the second electrodes 50. An area where the pixels 5 are formed in a matrix pattern defines the image display area 2. Accordingly, by mounting the flexible board 90 to the first terminals 81 and the second terminals 82 at the side 201 of the second transparent substrate 20 with the aid of an anisotropic conductive material or the like, and then inputting signals to the first terminals 81 and the second terminals 82 of the second transparent substrate 20 through the flexible board 90, scan signals can be directly applied from the second terminals 82 to the second electrodes 50 formed on the second transparent substrate 20, and image data signals can be inputted to the first electrodes 40 formed on the first transparent substrate 10 through the first terminals 81, the conductive particles and the inter-substrate conducting terminal portions 60. Since the aligned condition of the liquid crystal, which is situated between the first electrodes 40 and the second electrodes 50, is controlled in accordance with the image data signals and the scan signals, a desired image can be displayed in the image display area 2.

Conventionally, as described before, signals are directly inputted from the first terminals 81 to the first electrodes 40 having the drive portions 41 which are formed to extend in the direction of length, and other signals are inputted to the second electrodes 50, which are routed toward the opposite lateral areas so as to bypass the first electrodes 40, through the inter-substrate conducting terminal portions extending obliquely. On the contrary, in this embodiment, signals are directly inputted from the second terminals 82 to the second electrodes 50 which are routed toward the opposite lateral areas so as to bypass the first electrodes 40.

Figure 29:
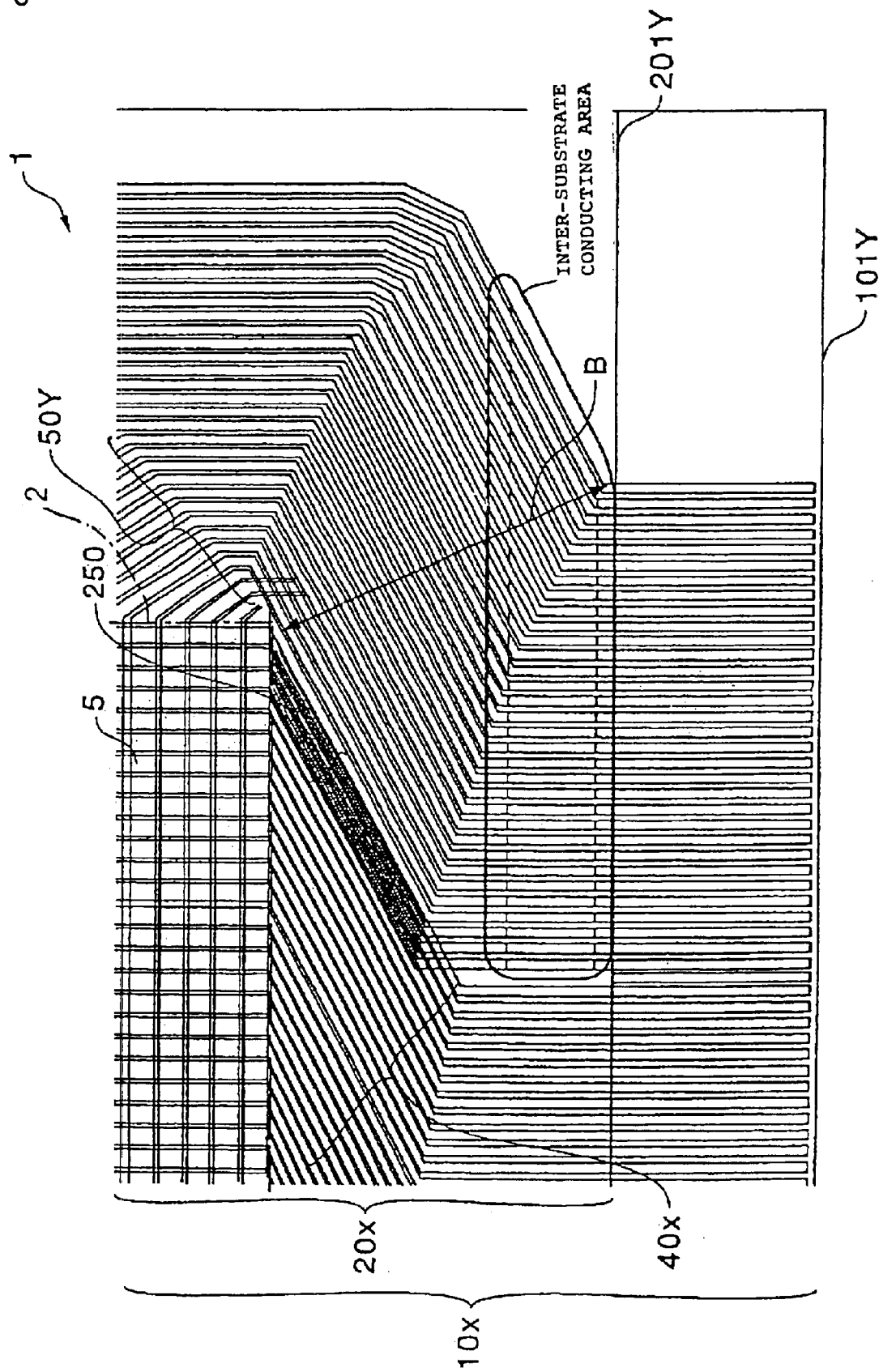
FIG. 29 is a plan view showing, in enlarged scale, the electrodes and the terminals in a state where the first transparent substrate shown in FIG. 27 and the second transparent substrate shown in FIG. 28 are bonded to each other.

As will be seen from the comparison between FIG. 7 and FIG. 29, in the second electrodes 50 to which scan signals are supplied, the wiring portions can be shortened and hence the electrical resistance can be reduced because the electrical conduction between both the substrates is not utilized. Therefore, image quality can be effectively improved as compared with the case of reducing the electrical resistance of the first electrodes 40 to which the image data signals are supplied.

In other words, with this embodiment, since the wire resistance of the second electrodes 50 serving as scan lines is reduced down to a smaller value than in the conventional construction, dulling of the scan signals can be suppressed to improve display quality. Display quality is more greatly affected by the wire resistance of the second electrodes 50 serving as common lines than by the wire resistance of the first electrodes 40 serving as segment lines. Accordingly, a reduction in the wire resistance of the second electrodes 50 in this embodiment provides a noticeable improvement of the display quality.

Further, the electrical conduction between both the substrates is no longer needed on the second transparent substrate 20 in its area in which patterns are necessarily obliquely extended (i.e., in its region (having a region width indicated by arrow A) where patterns must be obliquely formed between a corner portion of an innermost pattern of the second electrodes 50, which is bent near a corresponding corner of the image display area, and a corner portion of an outermost pattern of the second electrodes 50). In such an area in which patterns are necessarily obliquely extended, it is only necessary to arrange the wiring portions 52 of the second electrodes 50 which can be formed with a reduced distance between their patterns.

Accordingly, the inter-substrate conducting terminal portions 60 for establishing the electrical conduction between both the substrates, and the ends 70 of the first terminals 81 can be formed straight. Then, in the wiring portions 52 of the second electrodes 50, straight zones 501 can be formed with lengths differing to a relatively small extent between patterns adjacent to each other, and then obliquely bent so as to form inclined zones 502 of the second electrodes 50 at smaller intervals therebetween. As will be seen from FIG. 6, therefore, an angle β formed by a line F connecting the boundaries between the straight zones 501 and the inclined zones 502 of the second electrodes 50 with respect to the side 201 of the second transparent substrate 20 is relatively small. Correspondingly, a larger number of patterns can be formed even in the region where a greater restriction is imposed on pattern layout. As a result, there is no need of narrowing the spacing between adjacent two of the inter-substrate conducting terminal portions 60 and the spacing between adjacent two of the first terminals 81 even in the case of increasing the number of patterns to be formed in the region where a greater restriction is imposed on pattern layout.

With this embodiment, therefore, in the electro-optic device 1 of a type that permits signals to be inputted from one substrate (second transparent substrate 20) to the other substrate (first transparent substrate 10) using the sealing material 30 (electrically conducting material) held between both the substrates, reliability of the inter-substrate conducting terminal portions does not deteriorate even in the case where the number of electrodes is increased.

Also, with this embodiment, the second electrodes 50, which are subjected to such a restriction on electrode layout that patterns must be obliquely extended, are formed of a metallic film having smaller electrical resistance than an ITO film, such as an aluminum film, an alloy film made of primarily aluminum, a silver film, or a silver alloy film made of primarily silver. Electrical characteristics are therefore kept from deteriorating regardless of a reduction in the line width of the wiring portions 52 of the second electrodes 50, which do not take part in constituting the pixels. Accordingly, this embodiment can prevent display quality from degrading due to deterioration of the electrical characteristics even when the number of the second electrodes 50 is increased by narrowing the line width of the wiring portions 52 of the second electrodes 50.

Conversely speaking, given the number of patterns being the same, the region of the second transparent substrate 20, in which patterns must be obliquely extended, can be made narrower than required in the conventional construction. In the electro-optic device 1 having the same outer dimensions, it is possible to enlarge the image display area 2. Further, since the region of the second transparent substrate 20, in which patterns must be obliquely extended, can be made narrower than required in the conventional construction, it is possible to reduce the outer dimensions of the electro-optic device 1 having the image display area 2 that is the same size as in conventional devices.

In Embodiment 1 described above, the second terminals 82 are formed on both sides of the first terminals 81 in the direction of width of the second transparent substrate 20. However, the terminal arrangement may be modified such that the second terminals 82 may be formed on one side of the first terminals 81 in the direction of width of the second transparent substrate 20, and the second electrodes 50 may be extended from that one side to the image display area 2.

In the electro-optic device 1, a driving IC is often mounted on the substrate by the COG technique. In this case, signals are inputted to the driving IC from the exterior, and image data signals and scan signals are outputted from the driving IC to respective electrodes. An embodiment in which the present invention is applied to that type of electro-optic device will be described below with reference to FIGS. 8, 9, 10, 11 and 12. Note that since the electro-optic device of this embodiment is of the same basic construction as that of Embodiment 1, components having the common functions are denoted by the same reference numerals and omitted from the following description.

Figure 8:
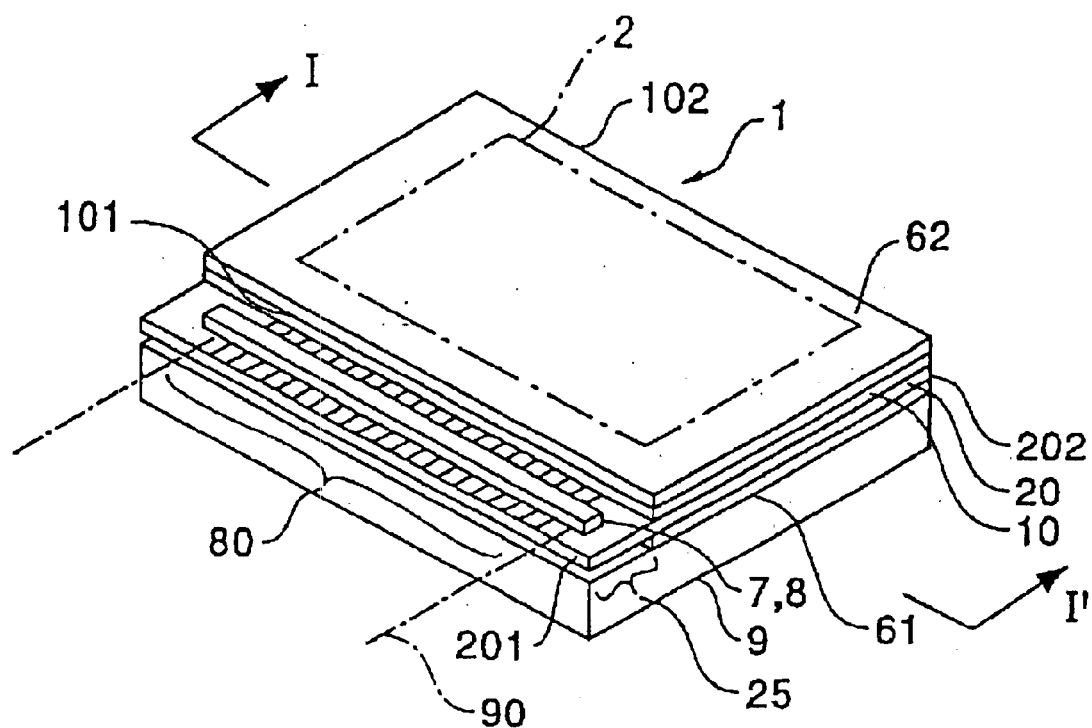
FIG. 8 is a perspective view of an electro-optic device according to Embodiment 2 of the present invention.
Figure 9:
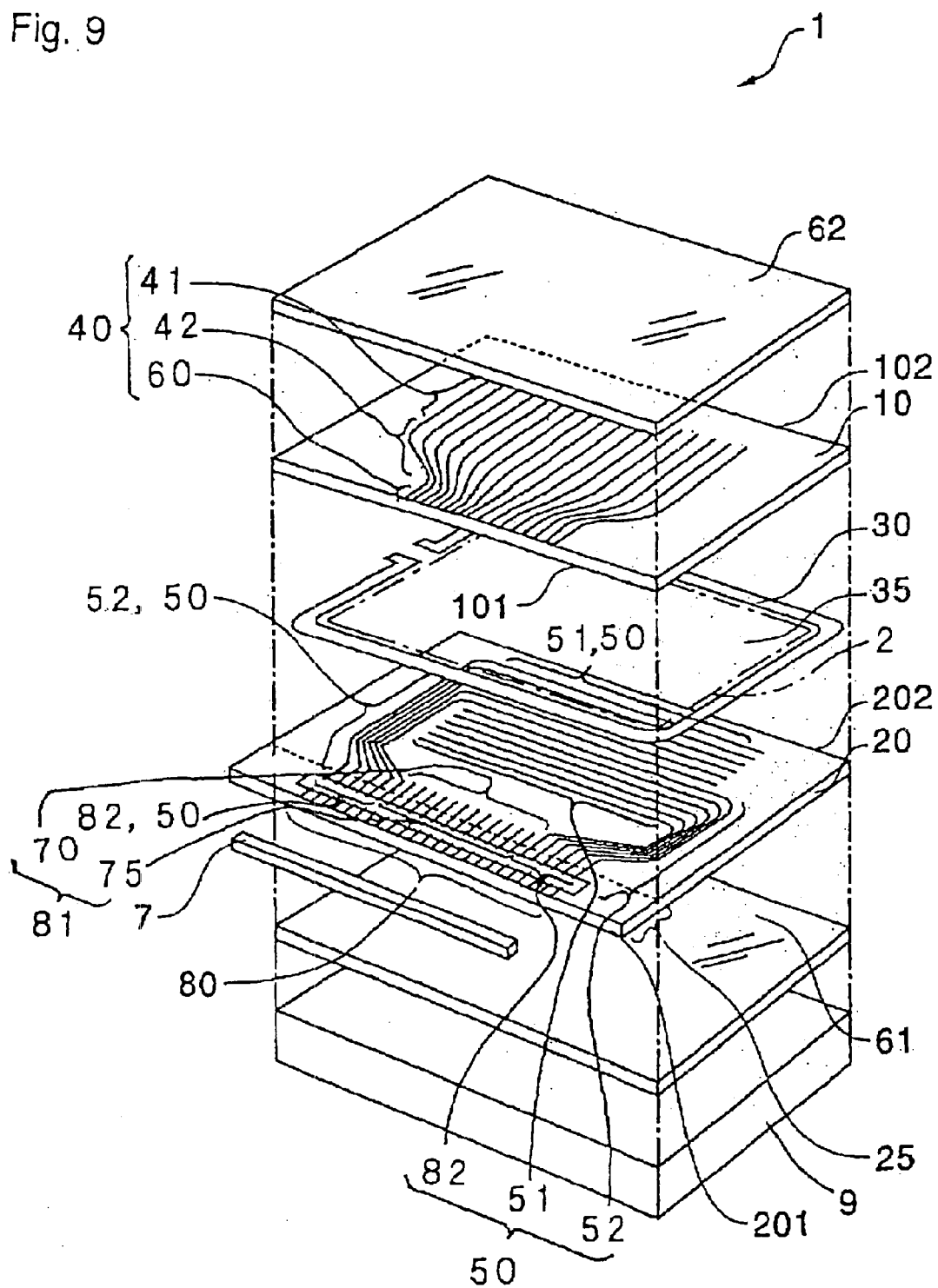
FIG. 9 is an exploded perspective view of the electro-optic device shown in FIG. 8.
Figure 10:
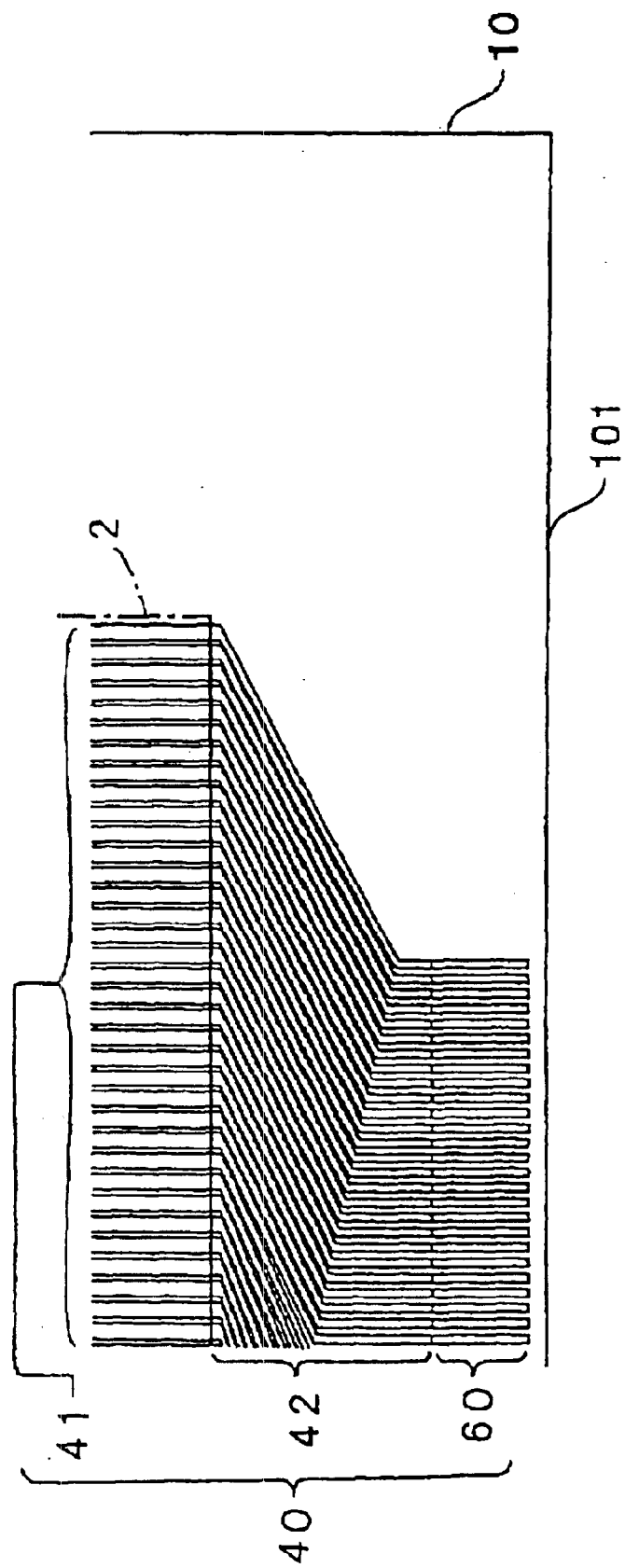
FIG. 10 is a plan view showing first electrodes and terminals formed on a first transparent substrate of the electro-optic device shown in FIG. 8.
Figure 11:
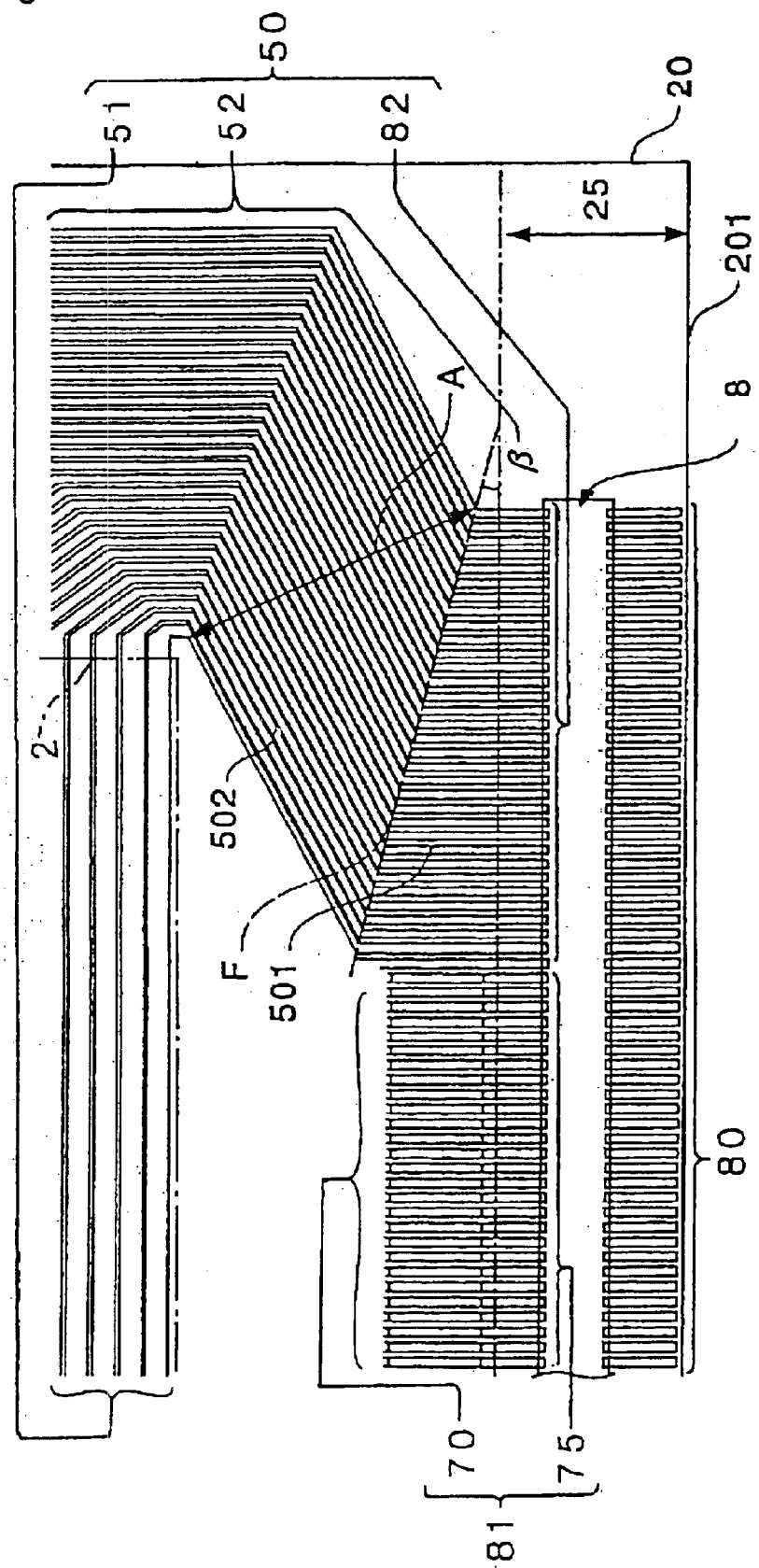
FIG. 11 is a plan view showing second electrodes and terminals formed on a second transparent substrate of the electro-optic device shown in FIG. 8.
Figure 12:
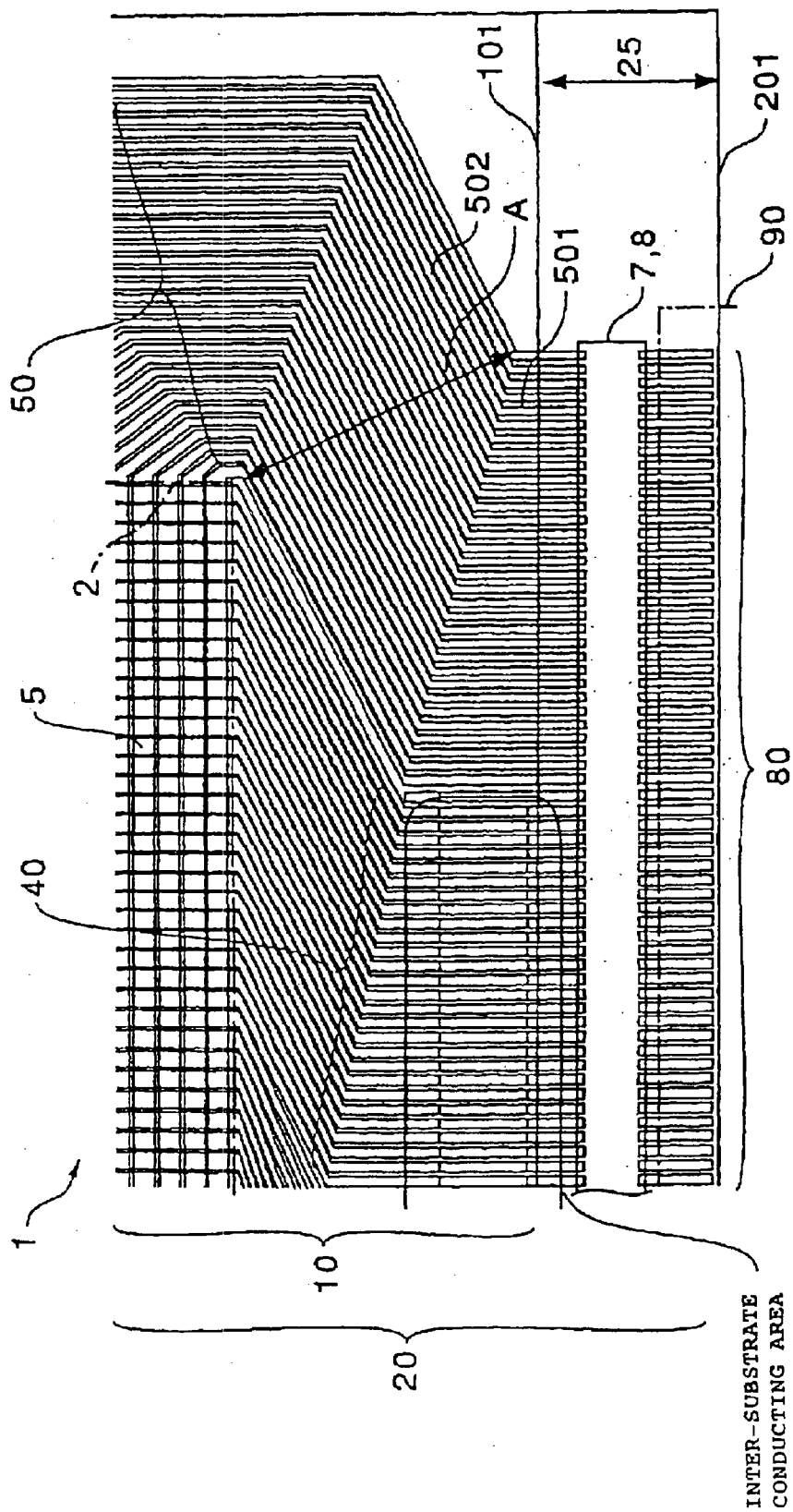
FIG. 12 is a plan view showing, in enlarged scale, the electrodes and the terminals in a state where the first transparent substrate shown in FIG. 10 and the second transparent substrate shown in FIG. 11 are bonded to each other.

FIGS. 8 and 9 are respectively a perspective view and an exploded perspective view of the electro-optic device of this embodiment. FIGS. 8 and 9 just schematically show electrodes and terminals, details of which will be described with reference to FIGS. 10, 11 and 12. FIGS. 10 and 11 are plan views showing respectively, in enlarged scale, first electrodes and terminals formed on a first transparent substrate and second electrodes and terminals formed on a second transparent substrate of the electro-optic device shown in FIGS. 8 and 9. FIG. 12 is a plan view showing, in enlarged scale, the electrodes and the terminals in a state where the first transparent substrate shown in FIG. 10 and the second transparent substrate shown in FIG. 11 are bonded to each other. Incidentally, since a section of the electro-optic device of this embodiment and crossed portions of electrodes in the electro-optic device are represented similarly to FIGS. 3 and 4 which have been referred to the above description of Embodiment 1, they will be described with reference to FIGS. 3 and 4.

Referring to FIGS. 8 and 9, in an electro-optic device 1 of this embodiment, as with above Embodiment 1, a pair of transparent substrates each being made of a rectangular glass, for example, are bonded to each other by a sealing material 30 with a predetermined gap left therebetween. A liquid crystal sealed-in space 35 is defined by the sealing material 30 between both the substrates, and a liquid crystal is sealed in the liquid crystal sealed-in space 35. Also in the following description, of the pair of transparent substrates, one provided with plural columns of first electrodes 40 formed thereon to extend over an image display area 2 in the direction of length is assumed to be a first transparent substrate 10, and the other provided with plural rows of second electrodes 50 formed thereon to extend over the image display area 2 in the direction of width is assumed to be a second transparent substrate 20.

In the electro-optic device 1 described herein, as with above Embodiment 1, a polarizing plate 61 is affixed to an outer surface of the second transparent substrate 20, and a polarizing plate 62 is affixed to an outer surface of the first transparent substrate 10. Further, a backlight device 9 is disposed outside the second transparent substrate 20.

On the first transparent substrate 10, as described above in connection with Embodiment 1 by referring to FIG. 3, sets of color filters 7R, 7G and 7B of red (R), green (G) and blue (B) are formed in areas corresponding to points at which the first electrodes 40 intersect the second electrodes 50. An insulating flattening film 11, the first electrodes 40 and an alignment film 12 are formed in this order on the surface side of the color filters 7R, 7G and 7B. On the second transparent substrate 20, the second electrodes 50 and an alignment film 22 are formed in this order.

In the electro-optic device 1, the first electrodes 40 are formed of an ITO film (transparent conductive film). On the other hand, the second electrodes 50 are formed of a metallic film (conductive film) capable of reflecting light, such as an aluminum film, an alloy film made of primarily aluminum, a silver film, or a silver alloy film made of primarily silver.

The number of lines of the first electrodes 40 is larger than that of the second electrodes 50.

Also in this embodiment, as described above in connection with Embodiment 1 by referring to FIG. 4, a plurality of narrow slit-like openings 510 are formed in each of portions of the second electrodes 50 in which they intersect the first electrodes 40 within the image display area 2. In the electro-optic device 1 of this embodiment, therefore, data can be displayed in a transmissive mode and a semi-transmissive, semi-reflective mode. Other than transparent conductive films such as an ITO film, the second electrodes 50 can be therefore formed of a metallic film having small electrical resistance, such as an aluminum film, an alloy film made of primarily aluminum, a silver film, or a silver alloy film made of primarily silver, so long as it is a conductive film capable of reflecting light. On the side of the second transparent substrate 20, therefore, wires and terminals (described later with reference to FIGS. 10, 11 and 12), which are formed at the same time as the second electrodes 50, can also be formed of a metallic film having small electrical resistance, such as an aluminum film, an alloy film made of primarily aluminum, a silver film, or a silver alloy film made of primarily silver, so that widths of their patterns are narrowed.

In the electro-optic device 1 constructed as described above, inputting of signals from the exterior and electrical conduction between both the substrates are made using areas near respective single sides 101, 201 of the first transparent substrate 10 and the second transparent substrate 20, which are located in the same direction. Accordingly, the second transparent substrate 20 is formed of a substrate having a larger size than the first transparent substrate 10. When the first transparent substrate 10 and the second transparent substrate 20 are bonded to each other, a portion of the second transparent substrate 20 is extended out of the side 101 of the first transparent substrate 10 to form an extended portion 25. By utilizing the extended portion 25, a driving IC 7 is mounted with the COF technology and a flexible board 90 (externally connecting board) is connected.

Also, an area of the second transparent substrate 20, on which the side 101 of the first transparent substrate 10 lies, is used to establish the electrical conduction with the first transparent substrate 10.

To realize such a construction for the electrical connection in this embodiment, as shown in FIGS. 9 and 10, the first electrodes 40 formed on the first transparent substrate 10 comprise, as with Embodiment 1, drive portions 41 extending straight over the image display area 2 in the direction of length, wiring portions 42 extending from the drive portions 41 toward a central region of the side 101 in a converging pattern, and inter-substrate conducting terminal portions 60 constituted by ends of the wiring portions 42. The inter-substrate conducting terminal portions 60 are formed to lie side by side at predetermined intervals along the side 101 of the first transparent substrate 10 in the central region thereof.

Herein, the inter-substrate conducting terminal portions 60 are extended straight toward a side 102 of the first transparent substrate 10 opposing to the side 101. Also, the wiring portions 42 are extended from the side 101 of the first transparent substrate 10 toward the opposing side 102 while obliquely spreading to the left and right, and are then connected to the drive portions 41 extending over the image display area 2 in a direction perpendicular to the sides 101, 102 of the first transparent substrate 10. The first electrodes 40, including the drive portions 41, the wiring portions 42 and the inter-substrate conducting terminal portions 60, are entirely formed of ITO films.

On the second transparent substrate 20, as shown in FIGS. 9 and 11, first terminals 81 and second terminals 82 are formed along the side 201 thereof over a relatively wide range except for opposite ends of the side 201. The first terminals 81 are formed in a widthwise central area of the second transparent substrate 20 so as to lie side by side at predetermined intervals along the side 201 thereof. The second terminals 82 are formed in two opposite areas of the second transparent substrate 20, which are located outside the widthwise central area including the first terminals 81, so as to lie side by side at predetermined intervals along the side 201 thereof. The first terminals 81 and the second terminals 82 are each extended straight toward a side 202 (see FIG. 2) of the second transparent substrate 20 opposing to the side 201.

The first terminals 81 have one ends 70 which are positioned to lie under the inter-substrate conducting terminal portions 60 when the first transparent substrate 10 and the second transparent substrate 20 are bonded to each other. Thus, the one ends 70 of the first terminals 81 are used for establishing the electrical conduction between both the substrates, the other ends 75 thereof are used for mounting the driving IC 7 in an IC mounting area 8.

The second terminals 82 are constituted to serve as ends of the second electrodes 50. More specifically, the second electrodes 50 comprise drive portions 51 extending in a width-wise direction straight over the image display area 2, wiring portions 52 leading from the drive portions 51 and routed toward outer opposite regions of the side 201 of the second transparent substrate 20, and the second terminals 82 constituted by ends of the wiring portions 52. The wiring portions 52 are routed so that they go around areas corresponding to both sides of the area, in which the first electrodes 40 are formed, when the first transparent substrate 10 and the second transparent substrate 20 are bonded to each other. The drive portions 51 are extended from the wiring portions 52 over the image display area 2 in a crossed relation to the first electrodes 40. Stated otherwise, the wiring portions 52 are obliquely extended to the left and right toward the opposite lateral areas corresponding to both sides of the area in which the first electrodes 40 are formed, and are then bent so as to extend straight along the image display area 2 toward the opposing side 202 of the second transparent substrate 20. Thereafter, the wiring portions 52 are connected to the drive portions 51 extending parallel to the sides 201, 202 of the second transparent substrate 20 over the image display area 2.

As with the first terminals 81, the second electrodes 50 are each formed of a metallic film which is formed in a predetermined pattern and is capable of reflecting light, such as an aluminum film, an alloy film made of primarily aluminum, a silver film, or a silver alloy film made of primarily silver.

Further, the number of lines of the first electrodes 40 is larger than that of the second electrodes 50.

Moreover, on the second transparent substrate 20, a plurality of external input terminals 80 are formed to lie side by side at predetermined intervals along the side 201 thereof. The external input terminals 80 are each extended straight toward the side 202 of the second transparent substrate 20 opposing to the side 201 (toward the image display area 2; see FIG. 9). One ends of the external input terminals 80 are used for connection of the flexible board 90, and the other ends of the external input terminals 80, which are positioned in the IC mounting area 8, are used for mounting the driving IC 7.

When constructing the electro-optic device 1 of this embodiment using the first transparent substrate 10 and the second transparent substrate 20 which have the above-described construction, as with Embodiment 1, in the step of bonding the first transparent substrate 10 and the second transparent substrate 20 through the sealing material 30, a gap material and conductive particles are mixed in the sealing material 30, and the sealing material 30 is further applied to the area in which the inter-substrate conducting terminal portions 60 and the ends 70 of the first terminals 81 are positioned to lie one above the other. Therefore, by placing the first transparent substrate 10 and the second transparent substrate 20 one above the other and then melting and hardening the sealing material 30 in this state while applying forces so as to narrow a gap between both the substrates, the conductive particles contained in the sealing material 30 are collapsed between the first transparent substrate 10 and the second transparent substrate 20, whereby the inter-substrate conducting terminal portions 60 and the ends 70 of the first terminals 81 are electrically conducted with each other.

Further, as shown in FIG. 12, as a result of bonding the first transparent substrate 10 and the second transparent substrate 20 through the sealing material 30, pixels 5 are formed in a matrix pattern by points at which the first electrodes 40 intersect the second electrodes 50. An area where the pixels 5 are formed in a matrix pattern defines the image display area 2. Accordingly, by mounting the flexible board 90 to the one ends of the external input terminals 80 with the aid of an anisotropic conductive material or the like and mounting the driving IC 7 to the other ends of the external input terminals 80 and the other ends 75 of the first terminals 71 with the aid of an anisotropic conductive material or the like at the side 201 of the second transparent substrate 20, and then supplying signals to the driving IC 7 through the flexible board 90, scan signals are directly applied from the driving IC 7 to the second electrodes 50 formed on the second transparent substrate 20 just through the second terminals 82, and image data signals are inputted to the first electrodes 40 formed on the first transparent substrate 10 through the first terminals 81, the conductive particles and the inter-substrate conducting terminal portions 60. Since the aligned condition of the liquid crystal, which is situated between the first electrodes 40 and the second electrodes 50, is controlled in accordance with the image data signals and the scan signals, a desired image can be displayed in the image display area 2.

Conventionally, as described before, signals outputted from the driving IC are directly inputted from the first terminals 81 to the first electrodes 40 having the drive portions 41 which are formed to extend in the direction of length, and other signals are inputted to the second electrodes 50, which are routed toward the opposite lateral areas so as to bypass the first electrodes 40, through the inter-substrate conducting terminal portions extending obliquely. On the contrary, in this embodiment, signals outputted from the driving IC 7 are directly inputted from the second terminals 82 to the second electrodes So which are routed toward the opposite lateral areas so as to bypass the first electrodes 40.

Because the electrical conduction between both the substrates is not utilized in the second electrodes 50 to which scan signals are supplied, the wiring portions can be shortened and hence the electrical resistance can be reduced. Therefore, image quality can be effectively improved as compared with the case of reducing the electrical resistance of the first electrodes 40 to which the image data signals are supplied.

In other words, with this embodiment, since the wire resistance of the second electrodes 50 serving as scan lines is reduced down to a smaller value than in the conventional construction, dulling of the scan signals can be suppressed to improve display quality. Display quality is more greatly affected by the wire resistance of the second electrodes 50 serving as common lines than by the wire resistance of the first electrodes 40 serving as segment lines. Accordingly, a reduction in the wire resistance of the second electrodes 50 in this embodiment provides a noticeable improvement of the display quality.

Further, the inter-substrate conducting terminal portions 60 for establishing the electrical conduction between both the substrates, and the first terminals 81 can be formed straight. Therefore, the electrical conduction between both the substrates is no longer needed in an area of the second transparent substrate 20 in which patterns are necessarily obliquely extended (i.e., in its region (having a region width indicated by arrow A) where patterns must be obliquely formed between a corner portion of an innermost pattern of the second electrodes 50, which is bent near a corresponding corner of the image display area, and a corner portion of an outermost pattern of the second electrodes 50). In such an area in which patterns are necessarily obliquely extended, it is only necessary to arrange the wiring portions 52 of the second electrodes 50 which can be formed with a reduced distance between their patterns.

Accordingly, in the second electrodes 50, straight zones 501 can be formed with lengths differing to a relatively small extent between patterns adjacent to each other, and then obliquely bent so as to form inclined zones 502 of the second electrodes 50 at smaller intervals therebetween. As will be seen from FIG. 11, therefore, an angle β formed by a line F connecting the boundaries between the straight zones 501 and the inclined zones 502 of the second electrodes 50 with respect to the side 201 of the second transparent substrate 20 is relatively small. Correspondingly, a larger number of patterns can be formed even in the region where a greater restriction is imposed on pattern layout. As a result, there is no need of narrowing the spacing between adjacent two of the inter-substrate conducting terminal portions 60 and the spacing between adjacent two of the first terminals 81 even in the case of increasing the number of patterns to be formed in the region where a greater restriction is imposed on pattern layout.

With this embodiment, therefore, in the electro-optic device 1 of a type that permits signals to be inputted from one substrate (second transparent substrate 20) to the other substrate (first transparent substrate 10) using an electrically conducting material held between both the substrates, reliability in the electrically conducted portions between both the substrates does not deteriorated even in the case where the number of electrodes is increased.

Also, with this embodiment, the second electrodes 50, which are subjected to such a restriction on electrode layout that requires patterns to be obliquely extended, are formed of a metallic film having smaller electrical resistance than an ITO film, such as an aluminum film, an alloy film made of primarily aluminum, a silver film, or a silver alloy film made of primarily silver. Electrical characteristics are therefore kept from deteriorating regardless of a reduction in the line width of the wiring portions 52 of the second electrodes 50, which do not take part in constituting the pixels. Accordingly, this embodiment can prevent display quality from degrading due to deterioration of the electrical characteristics even when the number of the second electrodes 50 is increased by narrowing the line width of the wiring portions 52 of the second electrodes 50.

Conversely speaking, given the number of patterns being the same, the region of the second transparent substrate 20, in which patterns must be obliquely extended, can be made narrower than required in the conventional construction. In the electro-optic device 1 having the same outer dimensions, it is possible to enlarge the image display area 2. Further, since the region of the second transparent substrate 20, in which patterns must be obliquely extended, can be made narrower than required in the conventional construction, it is possible to reduce the outer dimensions of the electro-optic device 1 having the image display area 2 that is the same size as in conventional devices.

In Embodiment 2 described above, the second electrodes 50 comprises the drive portions 51 extending straight over the image display area 2, and the wiring portions 52 routed from the drive portions 51 up to the area in which the driving IC 7 is mounted, the wiring portions 52 being formed on both outer sides of the first terminals 81 in the direction of width of the second transparent substrate 20. However, the terminal arrangement may be modified such that the second electrodes 50 may be routed from the area, in which the driving IC 7 is mounted, to pass through only one side outward of the first terminals 81 in the direction of width of the second transparent substrate 20, and may be then extended from that one side to the image display area 2.

Figure 13:
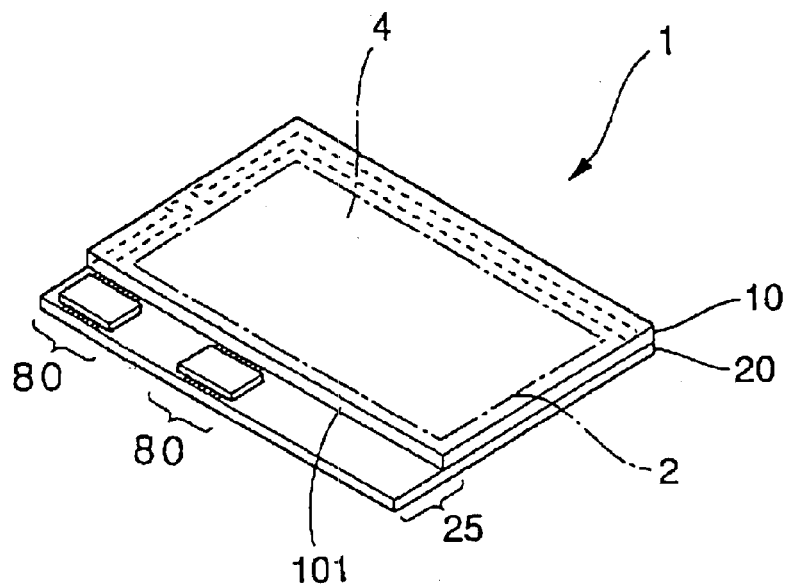
FIG. 13 is a perspective view showing the construction of an electro-optic device according to Embodiment 3 of the present invention.
Figure 14:
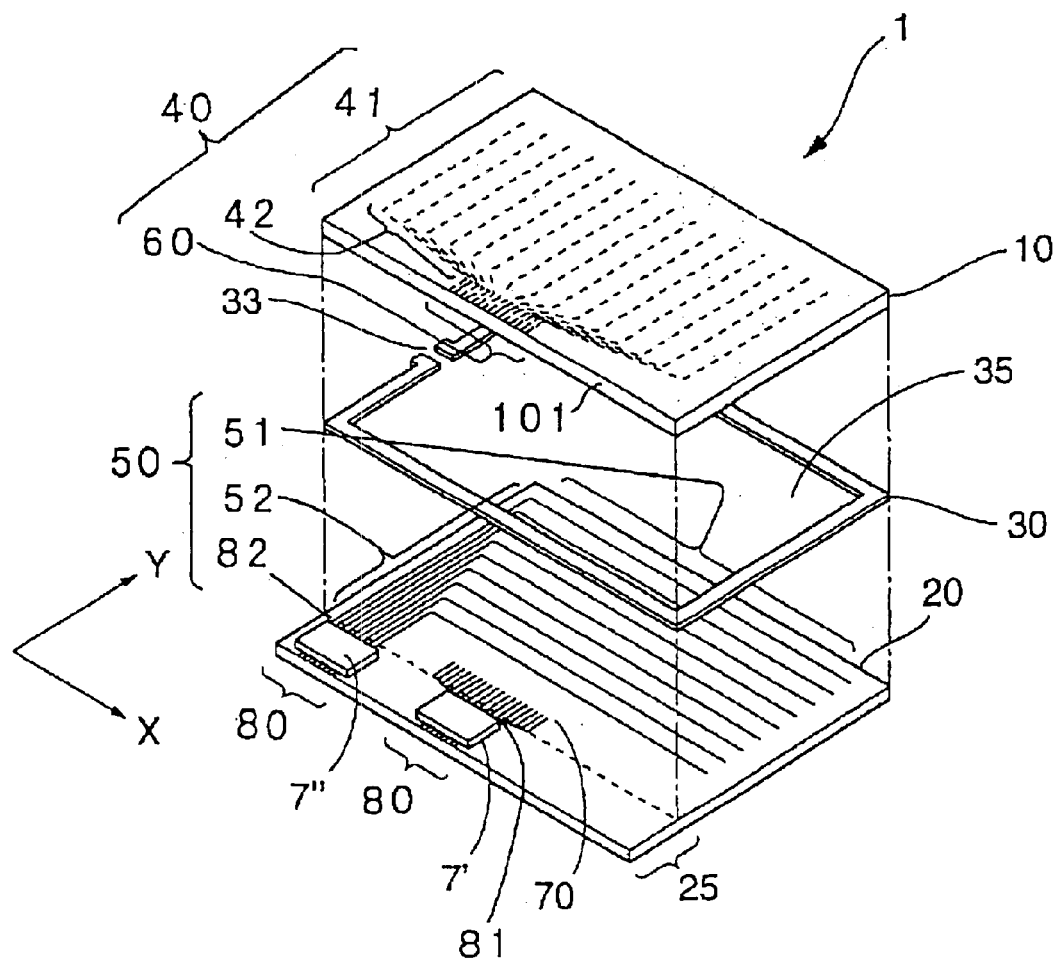
FIG. 14 is an exploded perspective view of the electro-optic device shown in FIG. 13.

FIGS. 13 and 14 are respectively a perspective view showing the construction of an electro-optic device 1 according to Embodiment 3 of the present invention, and an exploded perspective view of the electro-optic device 1.

As shown in FIGS. 13 and 14, the electro-optic device 1 of this embodiment comprises a first transparent substrate 10 and a second transparent substrate 20 arranged in an opposed relation, a sealing member 30 applied in the form of a rectangular frame for bonding both the substrates to each other, and a liquid crystal layer 4 sealed in a liquid crystal sealed-in space 35 surrounded by the first transparent substrate 10, the second transparent substrate 20, and the sealing member 30. Of the liquid crystal sealed-in space 35, an area in which later-described pixels are arrayed in a matrix pattern serves as an image display area 2.

The first transparent substrate 10 and the second transparent substrate 20 are each a plate-like member made of quartz, glass, plastic or the like. A plurality of electrodes for applying an electric field to the liquid layer 4 are formed on an inner surface (facing the liquid layer 4) of each substrate. More specifically, drive portions 41 of a plurality of first electrodes 40 are formed in a striped pattern on the inner surface of the first transparent substrate 10, whereas a plurality of second electrodes 50 having drive portions 51, which are extended perpendicularly to the first electrodes 40 in the image display area 2, are formed on the inner surface of the first transparent substrate 10. Also, inter-substrate conducting terminal portions 60 constituted by ends of wiring portions 42 of the first electrodes 40 are formed on the first transparent substrate 10, whereas second terminals 82 are formed on the second transparent substrate 20. Ends 70 of the second terminals 82 are electrically connected to the inter-substrate conducting terminal portions 60 through conductive particles contained in the sealing member 30. In this embodiment, the first electrodes 40 and the second electrodes 50 are transparent electrodes formed of, e.g., an ITO film. Additionally, in this embodiment, the number of lines of the first electrodes 40 is larger than that of the second electrodes 50. The first terminals 81 correspond to the first electrodes 40 in a one-to-one relation and are formed in the same number as the first electrodes 40.

As shown in FIGS. 13 and 14, the second transparent substrate 20 has a greater size (length) than the first transparent substrate 10 in one direction. In a state of both the substrates being bonded to each other, therefore, a portion of the second transparent substrate 20 is extended out of one edge (indicated by A in FIG. 14) of the first transparent substrate 10. A first driving IC 7' for supplying image data signals to the plurality of first electrodes 40 by utilizing the electrical conduction between both the substrates is mounted near the center of an extended portion 25 of the second transparent substrate 20 as viewed in the X-axis direction indicated in FIG. 14. On the other hand, a second driving IC 7" for supplying scan signals to the plurality of second electrodes 50 is disposed near one end of the extended portion 25 (on the negative side in the X-axis direction in FIG. 14). Further, external input terminals 80 connected to input terminals of the driving ICs 7, 7" are formed on the extended portion 25 so that image signals outputted from an external device are supplied to the driving ICs 7, 7" through the external input terminals 80.

The surface of the first transparent substrate 10 having the plurality of first electrodes 40 formed thereon and the surface of the second transparent substrate 20 having the plurality of second electrodes 50 formed thereon are each covered by an alignment film (not shown). The alignment film is prepared by carrying out a uniaxially aligning process, e.g., a rubbing process, on an organic thin film of polyimide or the like. When no electric field is applied, a liquid crystal sealed between both the substrates is aligned corresponding to the rubbing direction of the alignment film. Furthermore, polarizing plates (not shown) are affixed to outer surfaces of the first transparent substrate 10 and the second transparent substrate 20. A polarizing axis of each polarizing plate is set in accordance with the aligning direction of the alignment film covering the inner surface of each substrate.

The sealing material 30 is made of a thermosetting epoxy resin, for example, and is mixed with a spacer material for holding a gap between the first transparent substrate 10 and the second transparent substrate 20 at a constant thickness. A liquid crystal pouring port 33 is provided in the frame of the applied sealing material 30 for pouring the liquid crystal through it. The liquid crystal pouring port 33 is closed by an adhesive after the liquid crystal has been poured into the space surrounded by the first transparent substrate 10, the second transparent substrate 20 and the sealing material 3 to form the liquid crystal layer 4.

Conductive particles are also mixed in the sealing material 30 in addition to the spacer material. The conductive particles are formed of, e.g., elastically deformable plastic beads having plated surfaces. Though described above in detail, the inter-substrate conducting terminal portions 60 formed on the first transparent substrate 10 and the ends 70 of the first terminals 81 formed on the second transparent substrate 20 are electrically conducted with each other through the conductive particles.

The detailed construction of electrodes formed on the first transparent substrate 10 and the second transparent substrate 20 will be described below with reference to FIGS. 15 and 16.

Figure 15:
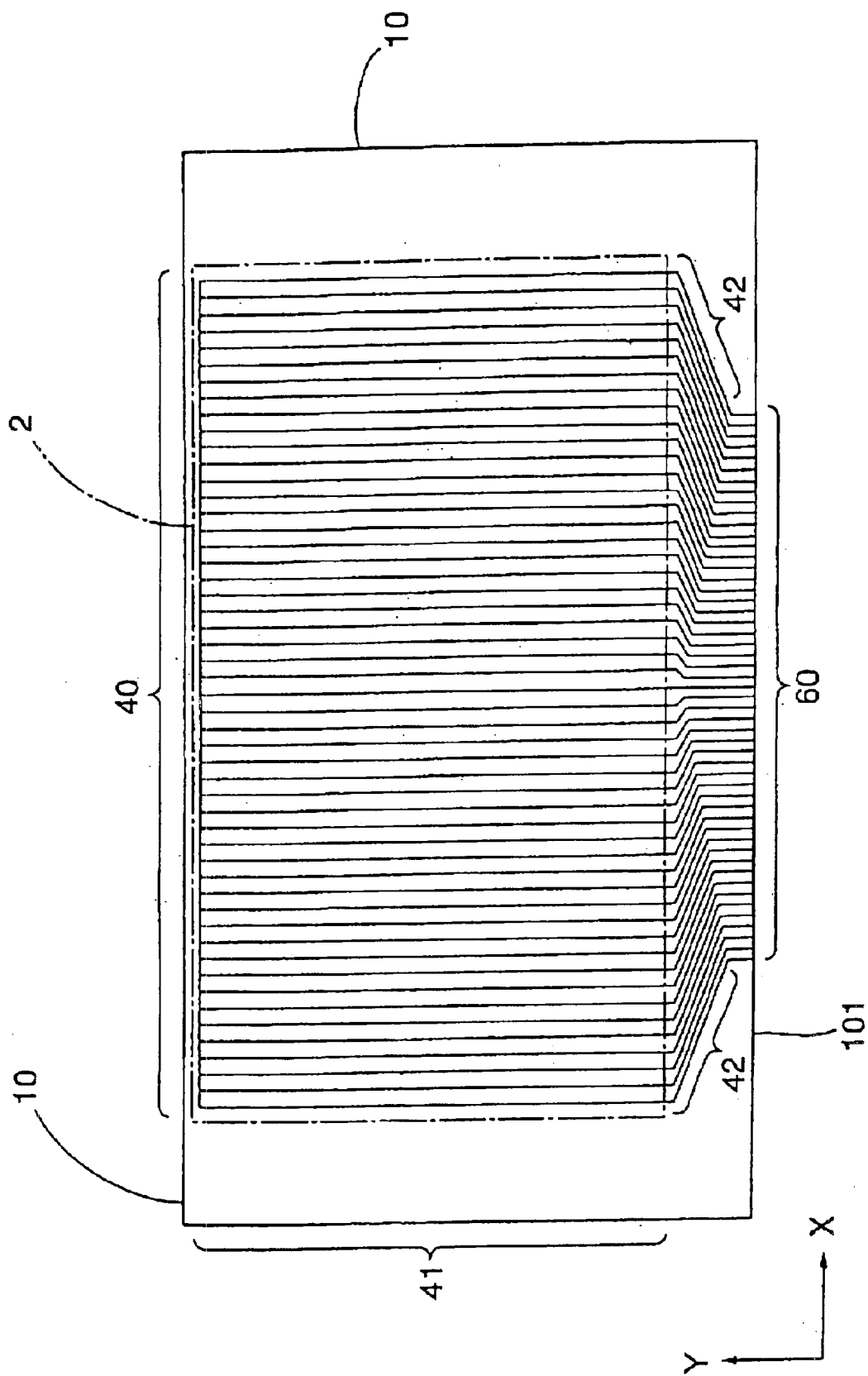
FIG. 15 is a plan view showing the detailed construction of a first transparent substrate used in the electro-optic device shown in FIG. 13.

First, FIG. 15 is a plan view showing the detailed construction of a surface of the first transparent substrate 10 on the side facing the liquid crystal layer 4. As shown in FIG. 15, the first electrodes 40 are formed on the surface of the first transparent substrate 10 facing the liquid crystal layer 4. The first electrodes 40 comprise the inter-substrate conducting terminal portions 60 formed in an area of the first transparent substrate 10 adjacent to a side 101 thereof to extend in a direction parallel to the Y-axis indicated in the drawing, wiring portions 42 extended from the inter-substrate conducting terminal portions 60 up to the image display area, and drive portions 41 extending straight over the image display area parallel to the Y-axis. A width covered by the inter-substrate conducting terminal portions 60 is smaller than that covered by the drive portions 41. Looking the plurality of first electrodes 40 as a whole, they are converged toward a central region of the side 101 of the first transparent substrate 10 in the vicinity of the side 101.

Figure 16:
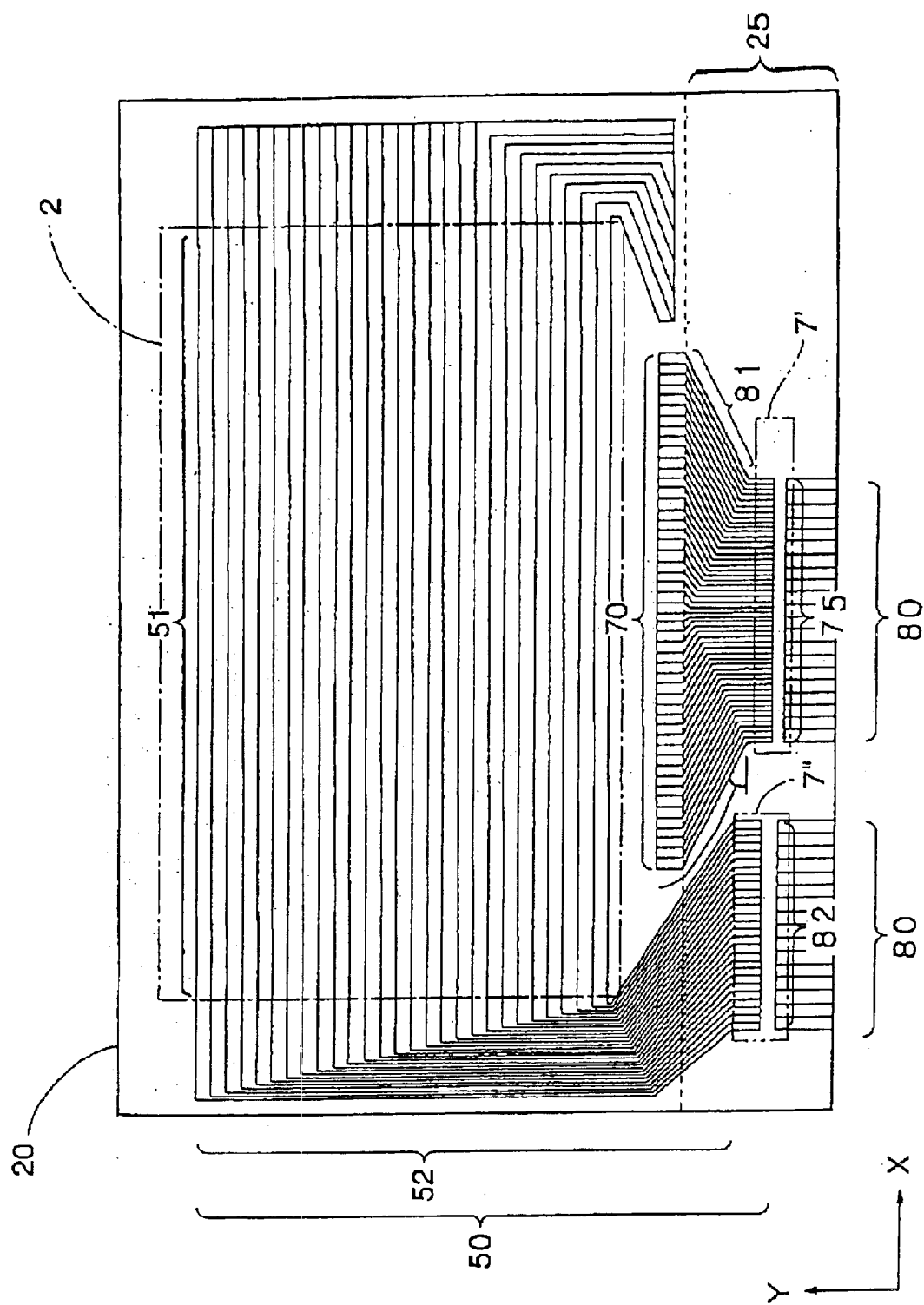
FIG. 16 is a plan view showing the detailed construction of a second transparent substrate used in the electro-optic device shown in FIG. 13.

Next, FIG. 16 is a plan view showing the detailed construction of a surface of the second transparent substrate 20 on the side facing the liquid crystal layer 4.

As shown in FIG. 16, the second electrodes 50 and the first terminals 81 are formed on the surface of the second transparent substrate 20 facing the liquid crystal layer 4.

One ends 70 of the first terminals 81, which are located in an area of the second transparent substrate 20 lying under the first transparent substrate 10 on the side near the extended portion 25, are formed in positions aligned with the inter-substrate conducting terminal portions 60 of the first transparent substrate 10, and the other ends 75 of the first terminals 81 are used for mounting the driving IC 7'. The one ends 70 of the first terminals 81 are extended straight toward the image display area parallel to one another in a nearly central area of the extended portion 25 in the X-axis direction (i.e., in the direction of width of the second transparent substrate 20). The other ends 75 of the first terminals 81 are also formed in a nearly central area of the extended portion 25 in the direction of width of the second transparent substrate 20 (i.e., in the X-axis direction).

On the other hand, the second electrodes 50 each comprise drive portions 51 extending straight over the image display area parallel to the X-axis, wiring portions 52, and second terminals 82 constituted by ends of the wiring portions 52. The second terminals 82 are used for mounting the driving IC 7". The wiring portions 52 are formed so as to extend from one ends of the drive portions 51, on the negative side in the X-axis direction, along one side of the second transparent substrate 20 and then reach the second terminals 82. Further, the second terminals 82 are formed in one end area of the extended portion 25 in the direction of width of the second transparent substrate 20 (i.e., in the X-axis direction).

Figure 17:
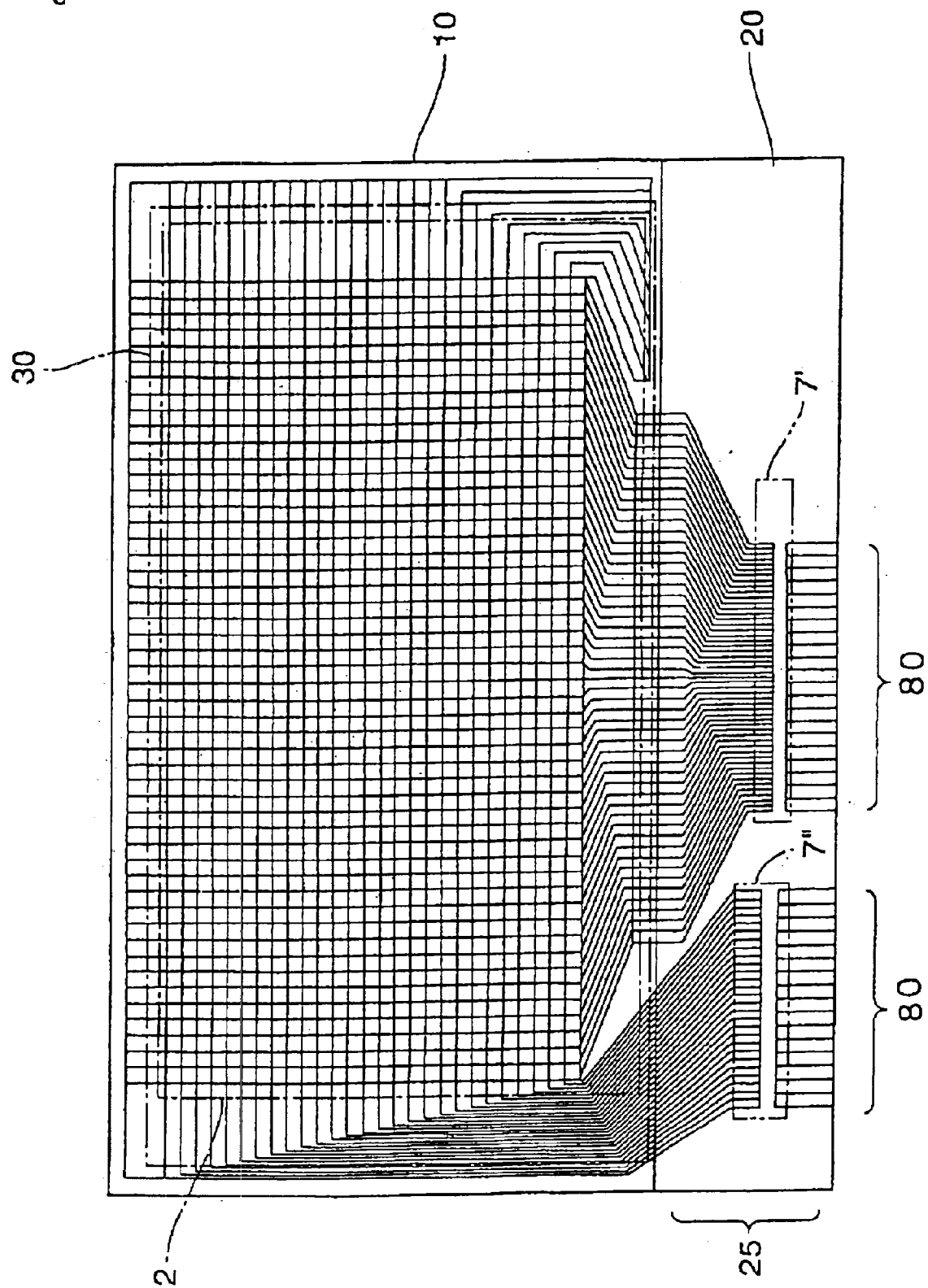
FIG. 17 is a plan view showing a state where the first transparent substrate shown in FIG. 15 and the second transparent substrate shown in FIG. 16 are bonded to each other

FIG. 17 is a plan view showing the detailed electrode arrangement, looking from the side of the first transparent substrate 10, when the first transparent substrate 10 and the second transparent substrate 20 are bonded to each other with the sealing material 30 applied between both the substrates such that the electrodes formed on the substrate surfaces face each other.

As will be seen from FIGS. 15, 16 and 17, in the state of both the substrates being bonded to each other, the inter-substrate conducting terminal portions 60 formed on the first transparent substrate 10 and the ends 70 of the first terminals 81 formed on the second transparent substrate 20 are positioned to face each other through the sealing material 30. Then, the inter-substrate conducting terminal portions 60 and the ends 70 of the first terminals 81 are electrically conducted with each other by the conductive particles mixed in the sealing material 30. As a result, corresponding ones of the first electrodes 40 and the first terminals 81 are electrically conducted with each other to form an integral data electrode. Looking these data electrodes as a whole, they are converged from the side of the first transparent substrate 10 toward a nearly central area of the extended portion 25 of the second transparent substrate 20.

Also, in the state of the first transparent substrate 10 and the second transparent substrate 20 being bonded to each other, the drive portions 41 of the first electrodes 40 and the drive portions 51 of the second electrodes 50 cross each other, pixels are formed at crossed points between both the electrodes, and the image display area is constituted by an area in which those pixels are arrayed in a matrix pattern.

Figure 21:
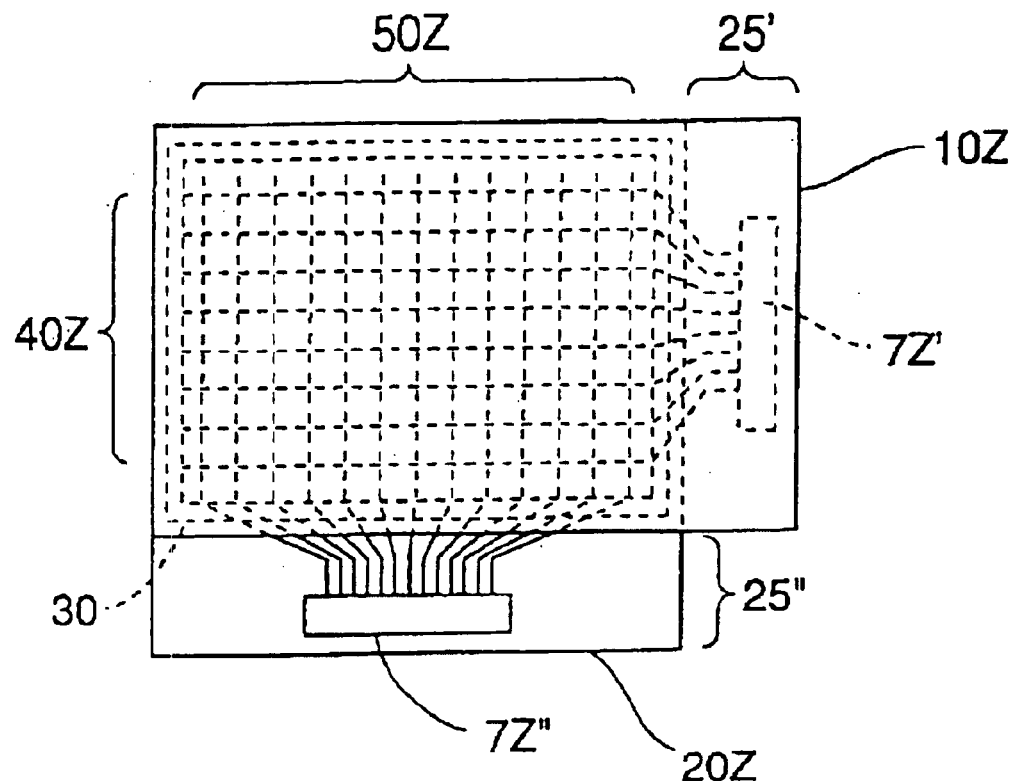
FIG. 21 is a plan view of a conventional electro-optic device.
Figure 22:
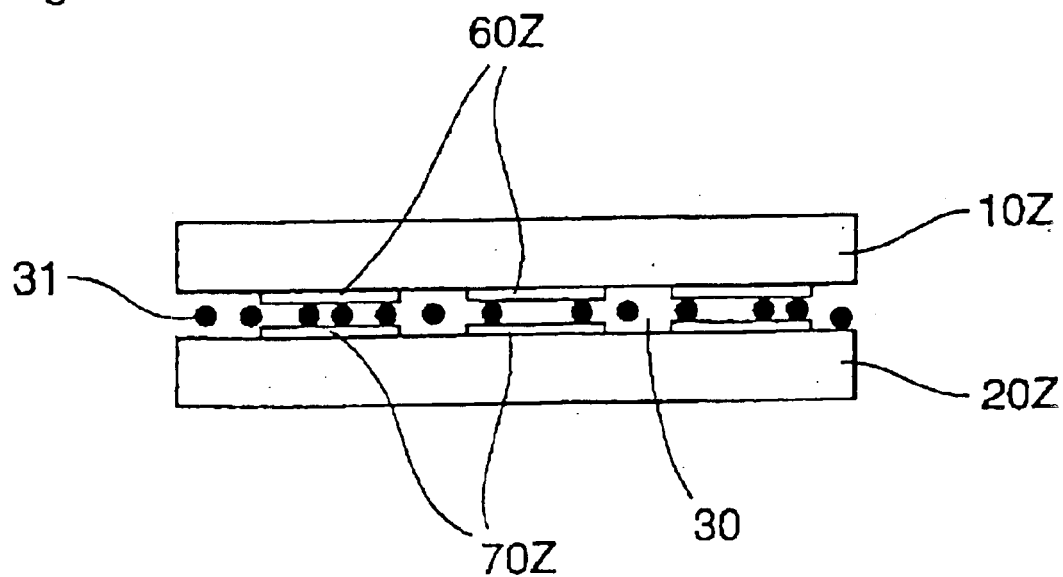
FIG. 22 is an explanatory view showing the structure for electrical conduction between substrates.
Figure 23:
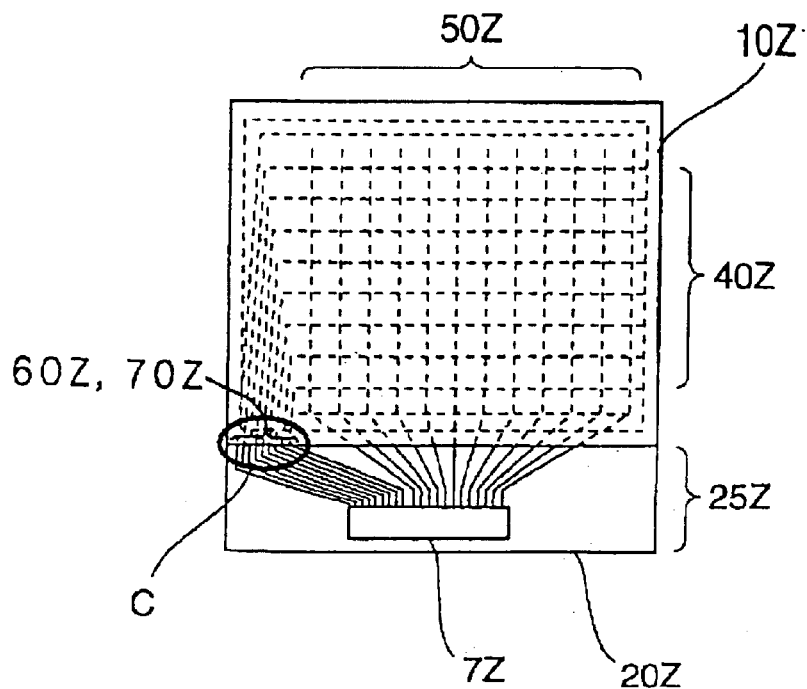
FIG. 23 is a plan view of another conventional electro-optic device.
Figure 24:
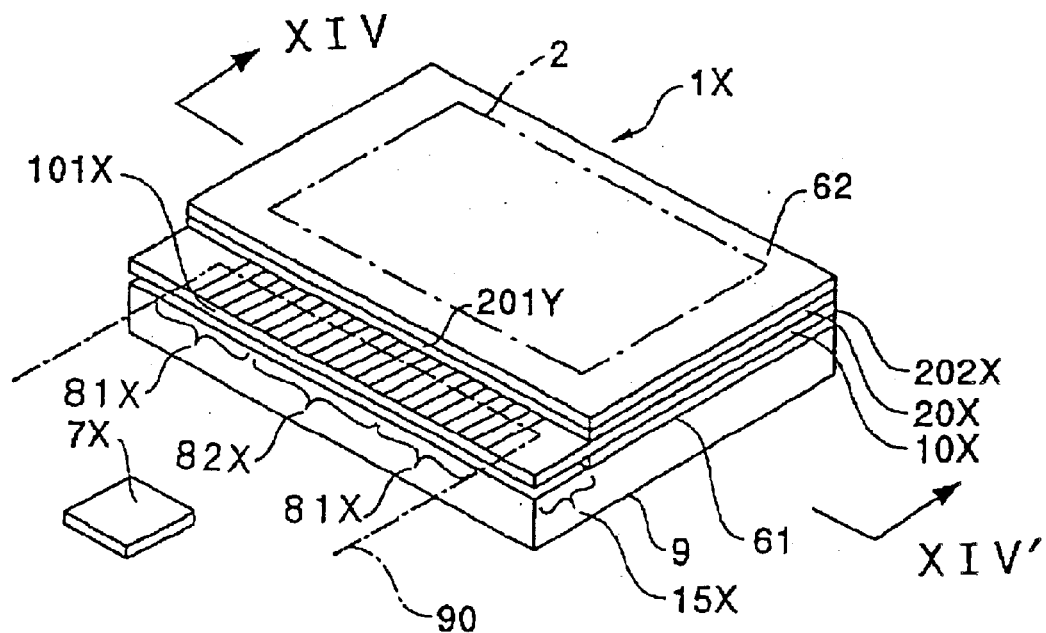
FIG. 24 is a perspective view of still another conventional electro-optic device.
Figure 25:
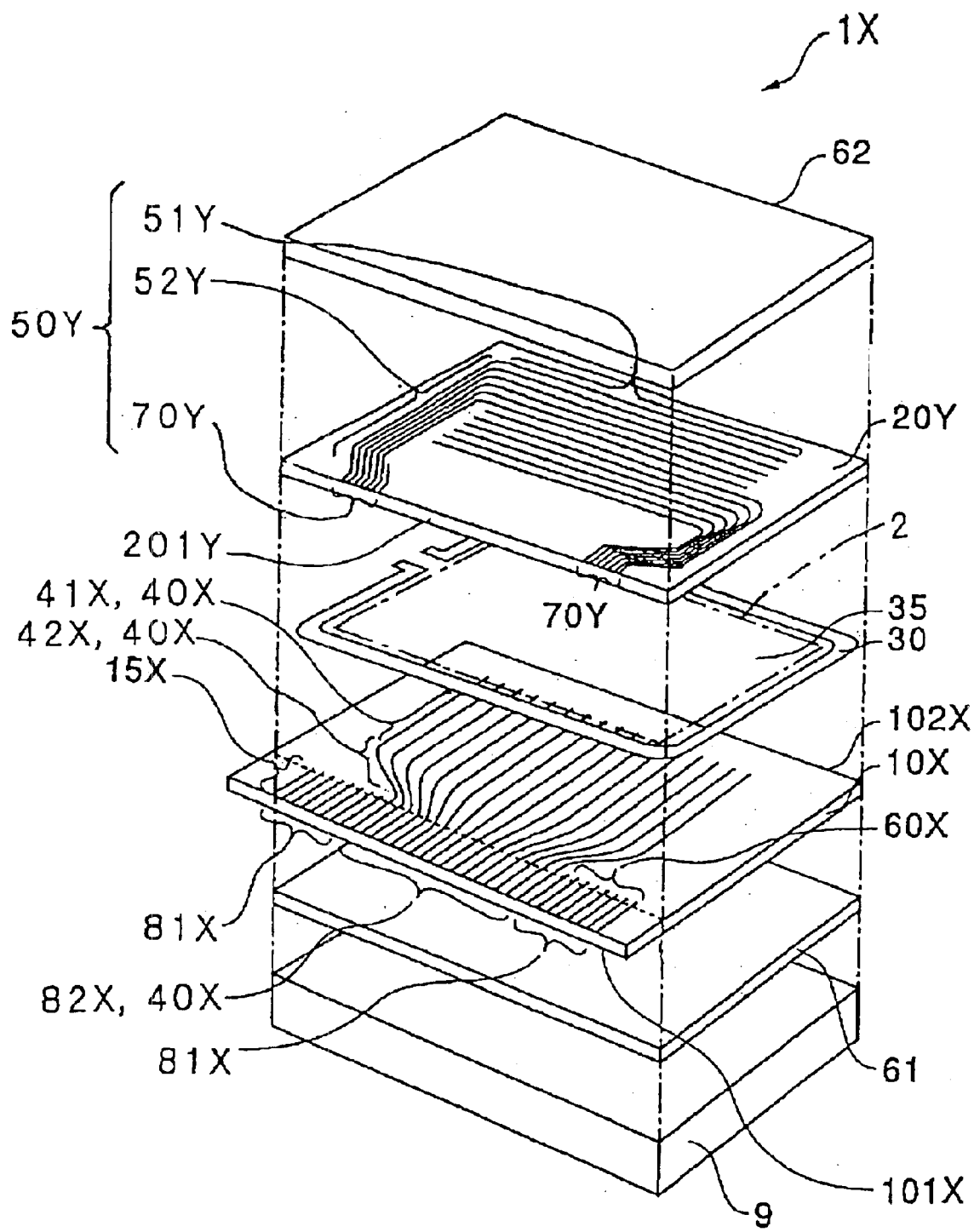
FIG. 25 is an exploded perspective view of the electro-optic device shown in FIG. 24.
Figure 26:
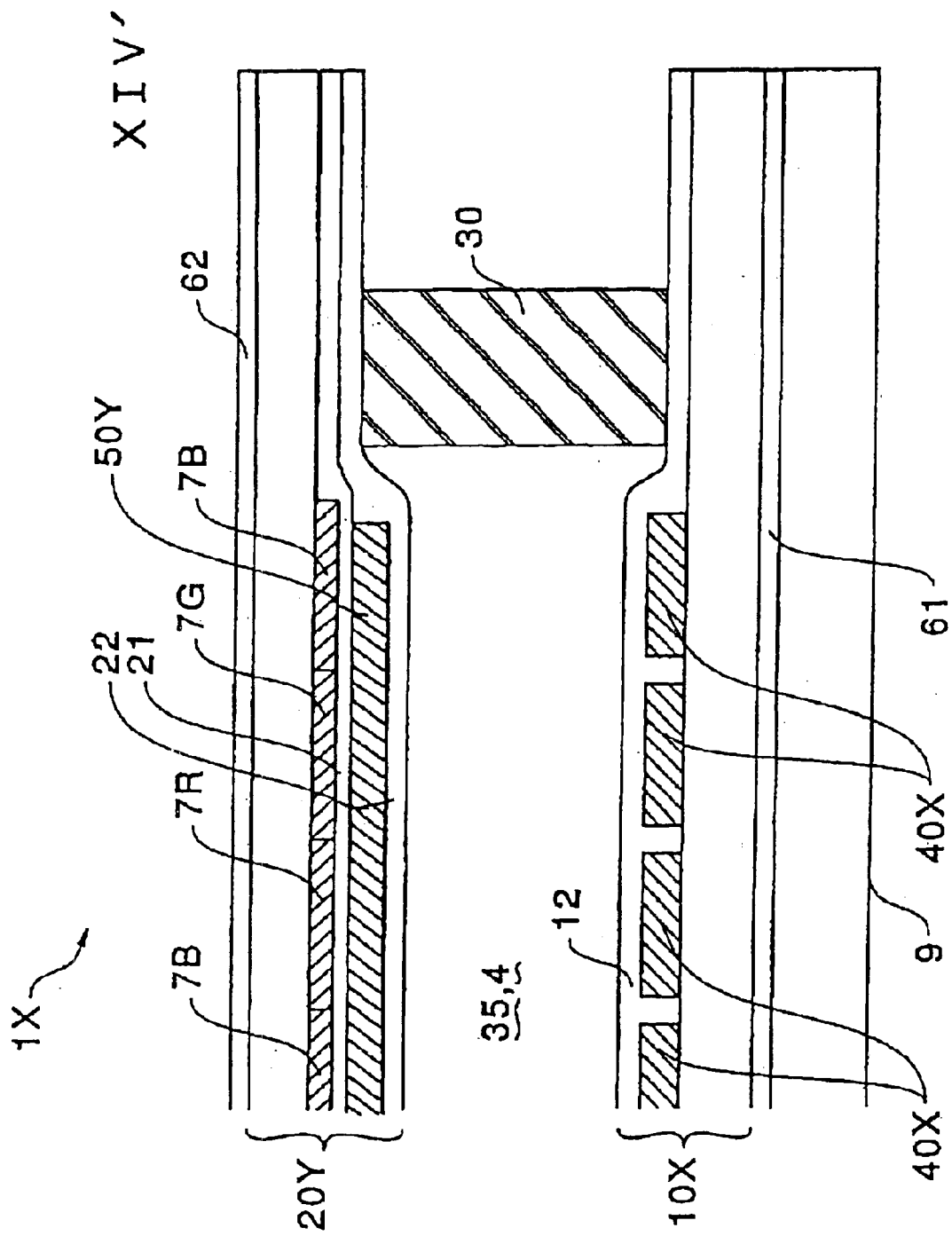
FIG. 26 is a sectional view of one end of the electro-optic device, shown in FIG. 24, indicated by XIV' when sectioned along line XIV–XIV' in FIG. 24.
Figure 27:
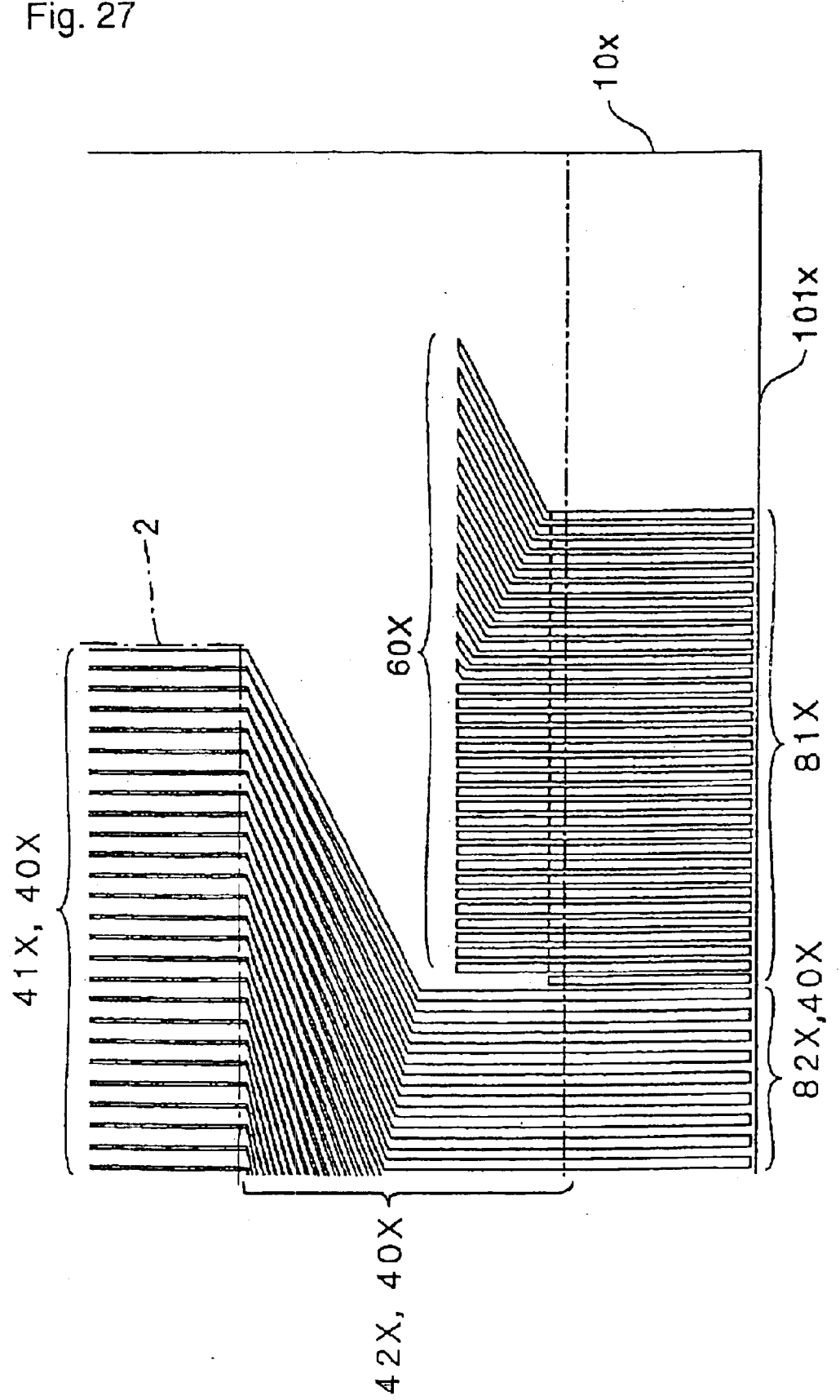
FIG. 27 is a plan view showing, in enlarged scale, first electrodes and terminals formed on a first transparent substrate of the electro-optic device shown in FIG. 24.
Figure 28:
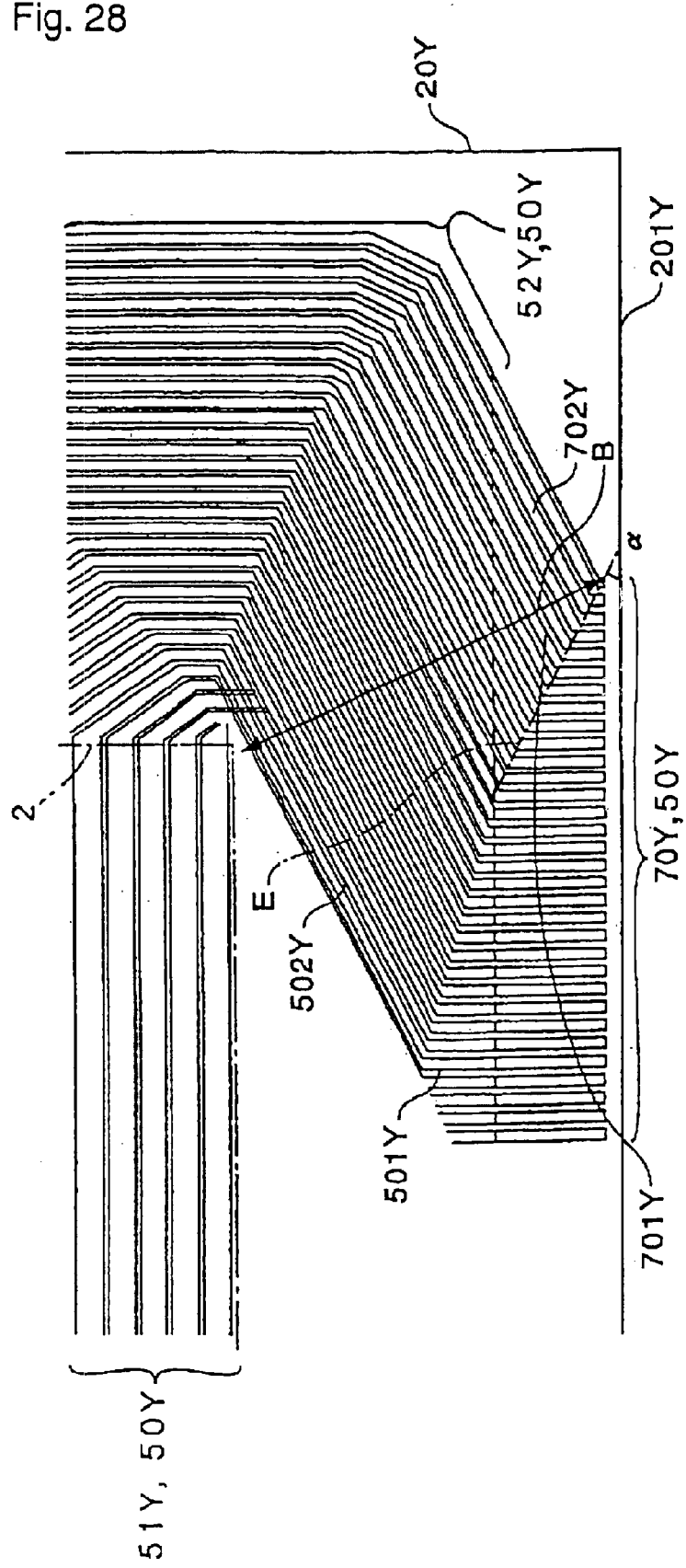
FIG. 28 is a plan view showing, in enlarged scale, second electrodes and terminals formed on a second transparent substrate of the electro-optic device shown in FIG. 24.

With this embodiment, as described above, since the driving ICs 7, 7" are both disposed on the extended portion 25 of the second transparent substrate 20, the size of the electro-optic device 1 can be reduced in comparison with that of the conventional device described before with reference to FIG. 21. Further, since image data signals and scan signals are outputted from the separate driving ICs 7', 7", the electrodes can be more easily formed than the case of employing one driving IC 7.

Also, in this embodiment, since the first electrodes 40 converge toward the central area of the extended portion 25 and connected to output terminals of the driving IC 7 which is also disposed near the central area of the extended portion 25, the following advantage is obtained.

If the first electrodes 40 converge toward a right end area of the extended portion 25 (on the positive side in the X-axis direction), an angle formed between the direction in which the wiring portions 42 are extended and the negative direction of the X-axis (corresponding to an angle γ indicated in FIG. 16) is smaller than that in the arrangement shown in FIG. 17, and a width of each wiring portion 42 must be narrowed in comparison with that in the arrangement shown in FIG. 17. This narrowing of the electrode width raises the problem that a disconnection of each electrode, a short-circuiting between adjacent electrodes, and other troubles are more likely to occur. By contrast, in this embodiment, since the first electrodes 40 converge toward the central area of the extended portion 25, the angle γ is not so small. Accordingly, the width of each wiring portion 42 is kept not so narrow as that in the case where the first electrodes 40 converge toward the end area of the extended portion 25, and hence the above-mentioned problem can be avoided.

Further, in this embodiment, of the first electrodes 40 and the second electrodes 50, the first electrodes 40 have a larger number of lines and converge toward the central area of the extended portion 25, thus the following advantage can be obtained. If the electrodes which have a smaller number of lines converge toward the central area of the extended portion 25, then it will be necessary to form the other electrodes having a larger number of lines so as to bypass the area in which the aforementioned electrodes have been formed. By contrast, in this embodiment, since the electrodes having a larger number of lines converge toward the central area of the extended portion 25, it is possible to form those electrodes on the substrate first and then form the other electrodes having a smaller number of lines so as to bypass the area in which the former electrodes have been formed. In comparison with the above-assumed case, therefore, restrictions imposed on the formation of the electrodes can be reduced.

Moreover, in this embodiment, data electrodes that converge toward the central area of the extended portion 25 are formed as electrodes divided into 2 groups, one for the first transparent substrate 10 and the other for the second transparent substrate 20, the divided electrodes being electrically conducted with each other through the conductive particles contained in the sealing material 30. By thus establishing the electrical conduction between both the substrates for connection of the electrodes that converge toward the central area of the extended portion 25, the following advantage can be obtained. When the electrodes having a larger number of lines that converge toward the central area of the extended portion 25 as described above, those electrodes can be formed prior to forming the other electrodes having a smaller number of lines. Accordingly, it can be assured that the inter-substrate conducting terminal portions 60 of the first electrodes 40 and the ends 70 of the first terminals 82 will have the necessary and sufficient shapes (including widths, intervals, etc.) to establish electrical connections therebetween through a conductive material.

This embodiment has been described, by way of example, in connection with the electro-optic device 1 wherein the electrodes to which image data signals are supplied have a larger number of lines than the electrodes to which scan signals are supplied. However, the present invention is also applicable to an electro-optic device wherein the electrodes to which scan signals are supplied have a larger number of lines than the electrodes to which image data signals are supplied. In this case, the electrodes having a larger number of lines likewise converge toward the central area of the extended portion 25 of the second transparent substrate 20.

Figure 18:
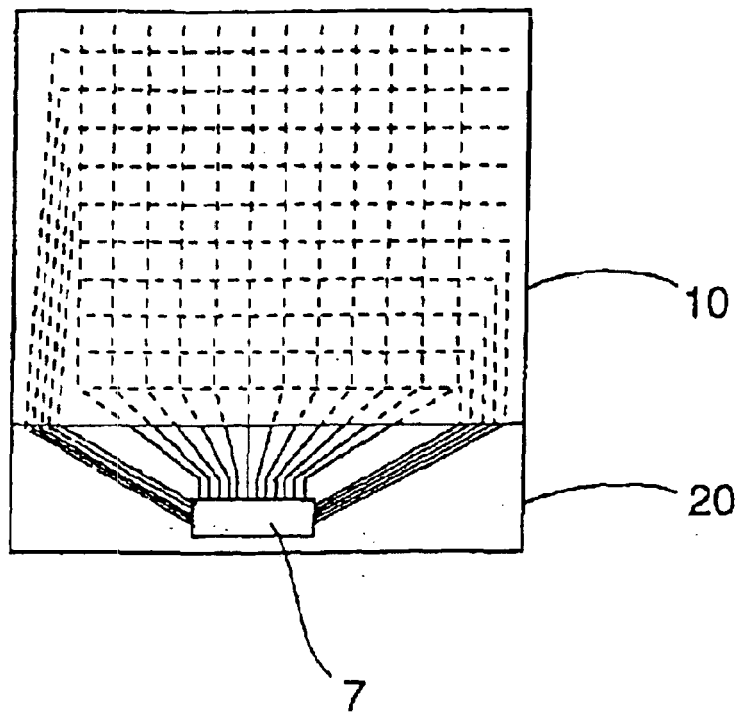
FIG. 18 is a plan view showing the structure of an area around a driving IC in an electro-optic device according to another embodiment of the present invention.

While signals are outputted from only one side of the driving IC 7 in above-described Embodiments 2 and 3, the signals may be outputted from three sides of the driving IC 7, by way of example, as shown in FIG. 18.

In Embodiment 1, the first electrodes 40 and the second electrodes 50 are each constructed such that image data signals or scan signals are applied through external input terminals from an externally mounted driving IC. In Embodiments 2 and 3, the first electrodes 40 and the second electrodes 50 are each constructed such that image data signals or scan signals are applied from a driving IC mounted by the COG technique. However, Embodiments 1 and 2 may be combined with each other so long as the first electrodes 40 are constructed to input signals by utilizing the electrical conduction between both the substrates. More specifically, one of either the first electrodes 40 or the second electrodes 50 may be constructed such that image data signals or scan signals are applied through external input terminals from an externally mounted driving IC, and the other of the first electrodes 40 and the second electrodes 50 may be constructed such that image data signals or scan signals are applied from a driving IC mounted on the substrate by the COG technique.

Further, while Embodiment 1 is constructed such that the flexible board 90 is connected to the external input terminals 80, another type of circuit board may be connected to the terminals 80 through a rubber connector or the like.

Additionally, the above-described semi-reflective/semi-transmissive type construction in combination of the reflective type and the transmissive type can be applied to not only a passive matrix electro-optic device, but also an active matrix electro-optic device.

Figure 19:
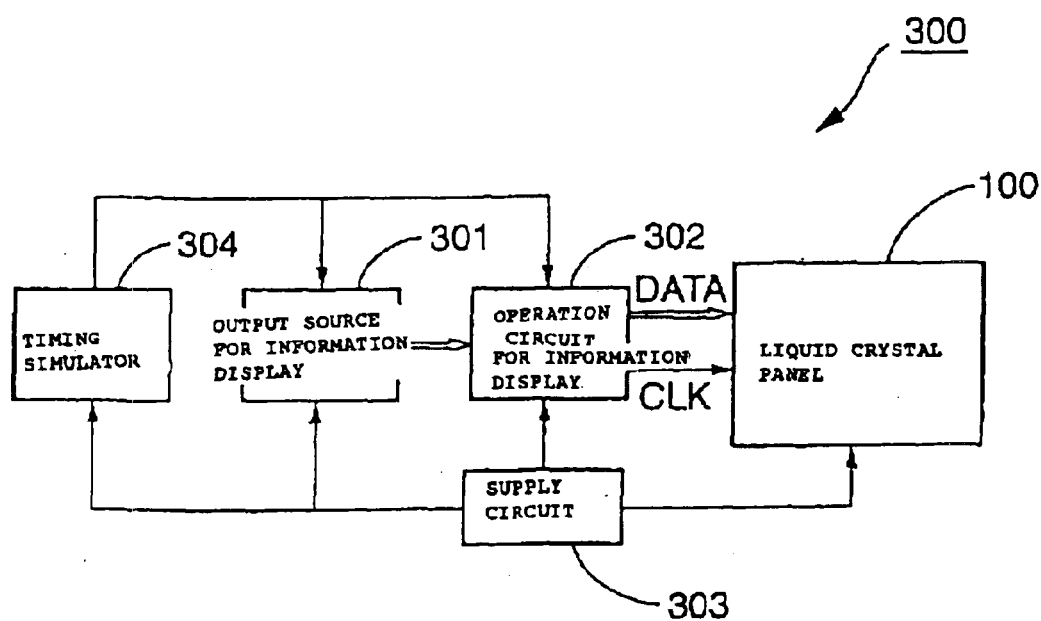
FIG. 19 is a block diagram showing the electrical configuration of an electronic apparatus employing the electro-optic device to which the present invention is applied.

A description will now be made of the case where the electro-optic device 1 according to each of the above-described embodiments is employed as a display device of various electronic apparatuses. In such an application, as shown in FIG. 19 by way of example, an electronic apparatus 300 comprises a display information output source 301, a display information processing circuit 302, a power supply circuit 303, a timing generator 304, and the electro-optic device 1 described above.

The display information output source 301 includes a memory such as a ROM or RAM, a storage unit such as any of various disks, a tuning circuit for tuning and outputting a digital image signal, etc. In accordance with various clock signals outputted from a timing generator 304, the display information output source 301 outputs display information, such as an image signal in a predetermined format, to the display information processing circuit 302. The display information processing circuit 302 includes various known circuits such as an amplifying/inverting circuit, a rotation circuit, a gamma correction circuit, and a clamping circuit. The display information processing circuit 302 executes processing of the display information supplied to it, and supplies a resultant image signal to a drive circuit of the electro-optic device 1 along with the clock signal. Further, the power supply circuit 303 supplies predetermined powers to the various components.

Practical examples of the electronic apparatuses include a portable personal computer, cellular phone, video cassette recorder of the view finder type or the monitor direct-view type, car navigation system, pager, electronic notepad, pocket-size calculator, word processor, work station, videophone, POS terminal, and various types of equipment including touch panels.

Figure 20:
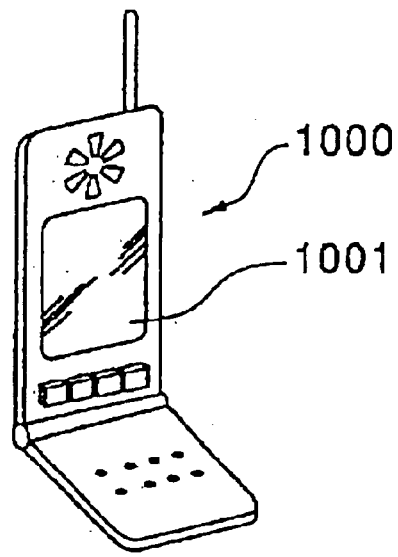
FIGS. 20(A), 20(B) and 20(C) show external appearances of electronic apparatuses each employing the electro-optic device to which the present invention is applied.
Figure 20:
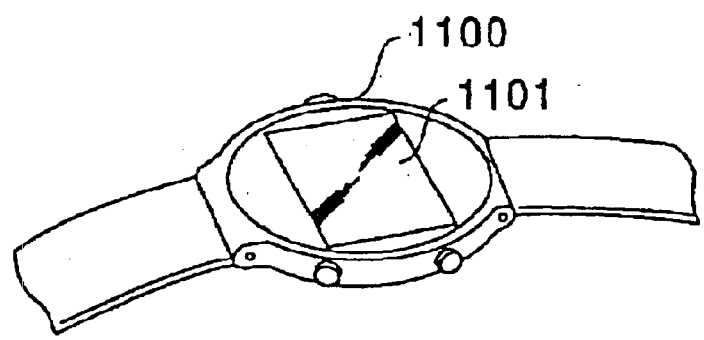
Figure 20:
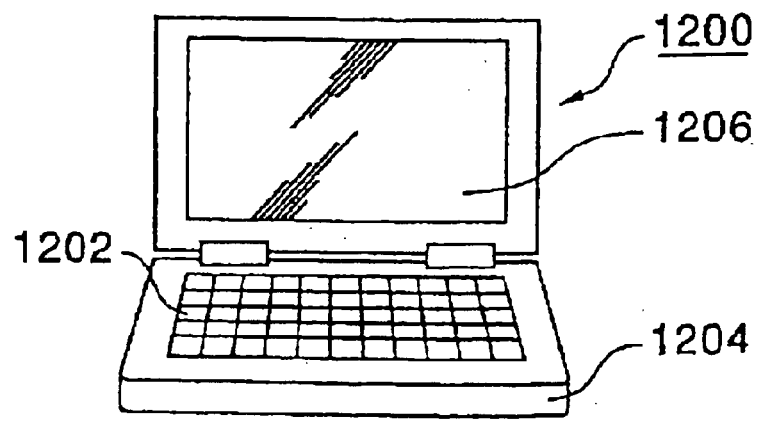

FIGS. 20(A), 20(B) and 20(C) show external appearances of electronic apparatuses each employing the electro-optic device 1 to which the present invention is applied.

FIG. 20(A) shows an external appearance of a cellular phone. In FIG. 20(A), numeral 1000 denotes a body of the cellular phone, and 1001 denotes an image display unit employing the electro-optic device 1 to which the present invention is applied.

FIG. 20(B) shows an external appearance of a wrist watch type electronic apparatus. In FIG. 20(B), numeral 1100 denotes a watch body, and 1101 denotes an image display unit employing the electro-optic device 1 to which the present invention is applied.

FIG. 20(C) shows an external appearance of a portable information processing apparatus such as a word processor and a personal computer. In FIG. 20(C), numeral 1200 denotes an information processing apparatus, 1202 denotes an input unit such as a keyboard, and 1206 denotes an image display unit employing the electro-optic device 1 to which the present invention is applied. Further, numeral 1204 denotes a body of the information processing apparatus.

In the electro-optic device according to the present invention, as described above, connection to first electrodes extending over an image display area in a length-wise direction is established through electrical conduction between a first substrate and a second substrate. To the second electrodes which are extended over the image display area in a width-wise direction while being routed toward the outer side so as to bypass the first electrodes, signals are directly inputted from external input terminals (second terminals). In a region where patterns must be obliquely extended, therefore, there is no need to utilize the electrical conduction between both the substrates. Thus, in the region where patterns must be obliquely extended, it is only necessary to form the second electrodes which can be formed with a reduced distance between the patterns. Accordingly, the necessity of reducing the spacing between inter-substrate conducting terminal portions is eliminated even when the number of lines is increased in the region where patterns must be obliquely extended. With the present invention, therefore, reliability in the region of the electrical conduction between both the substrates does not deteriorate even in cases where the number of electrodes is increased.

What is claim is:

1. An electro-optic device comprising a first substrate and a second substrate arranged in an opposed relation through a sealing material, said device further comprising:
   an electro-optic layer supported between said first substrate and said second substrate;
   first electrodes formed on said first substrate, and comprising a transparent conductive film;
   a second electrode formed on said second substrate;
   first terminals formed on said second substrate; and
   a plurality of driving ICs mounted on said second substrate,
   said first electrodes including a first drive portion for applying an electric field to said electro-optic layer, a wiring portion connected to said first drive portion, and an inter-substrate conducting terminal portion connected to said wiring portion, and electrically connected to said first terminals through conductive particles included in said sealing material,
   said second electrode including a second drive portion for applying an electric field to said electro-optic layer, and a second terminal connected to said second drive portion,
   said first and second terminals being arranged to lie side by side along one side of said second substrate, and connected respectively to said corresponding driving ICs,
   said first terminals being located closer to the center than said second terminal,
   said first terminals extending radially from said corresponding driving IC toward said inter-substrate conducting terminal portion,
   said wiring portion of said first electrodes extending radially from said inter-substrate conducting terminal portion toward said first drive portion, and
   said second drive portion, said second terminal of said second electrode, and said first terminals being made of a metallic film having a lower electrical resistance than that of said first electrodes.

2. An electro-optic device according to claim 1, wherein said second terminal is located on both sides of said first terminals in the direction along the one side of said second substrate.

3. An electro-optic device according to claim 1, wherein said second terminal is located on one side of said first terminals in the direction along the one side of said second substrate.

4. An electro-optic device according to claim 1, wherein said second electrode includes a second wiring portion for connecting said drive portion and said second terminal, and said wiring portion is located on the outer side relative to said first terminals in the direction along the one side of said second substrate.

5. An electro-optic device according to claim 1, wherein said second electrode is provided in plural number, and
   the number of said first electrodes is larger than the number of said second electrodes.

6. An electro-optic device according to claim 1, wherein an image data signal is supplied to said first electrodes, and a scan signal is supplied to said second electrode.

7. An electro-optic device according to claim 1, wherein said first electrodes is formed of at least an ITO film, and
   said second electrode is formed of at least a material selected from the group consisting of aluminum, silver, an aluminum alloy, and a silver alloy.

8. An electro-optic device according to claim 1, wherein said electro-optic layer is a liquid crystal layer.

9. An electronic apparatus employing, as a display unit, an electro-optic device according to claim 1.

10. An electro-optic device comprising a first substrate and a second substrate arranged in an opposed relation through a sealing material, said device further comprising:
    an electro-optic layer supported between said first substrate and said second substrate;
    first electrodes formed on said first substrate, and comprising a transparent conductive film;
    a second electrode formed on said second substrate;
    first terminals formed on said second substrate; and
    a plurality of driving ICs mounted on said second substrate,
    said first electrodes including a first drive portion for applying an electric field to said electro-optic layer, a wiring portion connected to said first drive portion, and an inter-substrate conducting terminal portion connected to said wiring portion, and electrically connected to said first terminals through conductive particles included in said sealing material,
    said second electrode including a second drive portion for applying an electric field to said electro-optic layer, and a second terminal connected to said second drive portion,
    said first and second terminals being arranged to lie side by side along one side of said second substrate, and connected respectively to said corresponding driving ICs,
    said second terminal being located on an outer side relative to said first terminals,
    said first terminals extending radially from said corresponding driving IC toward said inter-substrate conducting terminal portion,
    said wiring portion of said first electrodes extending radially from said inter-substrate conducting terminal portion toward said first drive portion, and
    said second drive portion, said second terminal of said second electrode, and said first terminals being made of a metallic film having a lower electrical resistance than that of said first electrodes.

11. An electro-optic device comprising a first substrate and a second substrate arranged in an opposed relation through a sealing material, said device further comprising:
    an electro-optic layer supported between said first substrate and said second substrate,
    first electrodes formed on said first substrate, and comprising a transparent conductive film, a second electrode formed on said second substrate, first terminals formed on said second substrate, a plurality of driving ICs mounted on said second substrate, and an extended portion of said second substrate extending out of an edge of said first substrate, said first electrodes including a first drive portion for applying an electric field to said electro-optic layer, a wiring portion connected to said first drive portion, and an inter-substrate conducting terminal portion connected to said wiring portion, and electrically connected to said first terminals through conductive particles included in said sealing material, said second electrode including a second drive portion for applying an electric field to said electro-optic layer, and a second terminal connected to said second drive portion, said first and said second terminals being disposed in at least said extended portion, said first and said second terminals being arranged to lie side by side along one side of said second substrate, and connected respectively to said corresponding driving ICs, said second terminal being located on the outer side relative to said first terminals, said first terminals extending radially from said corresponding driving IC toward said inter-substrate conducting terminal portion, said wiring portion of said first electrodes extending radially from said inter-substrate conducting terminal portion toward said first drive portion, and said second drive portion, said second terminal of said second electrode, and said first terminals being made of a metallic film having a lower electrical resistance than that of said first electrodes.

12. An electro-optic device comprising a first substrate and a second substrate arranged in an opposed relation through a sealing material, said device further comprising:

an electro-optic layer supported between said first substrate and said second substrate, first electrodes formed on said first substrate, and comprising a transparent conductive film, a second electrode formed on said second substrate, first terminals formed on said second substrate, a plurality of driving ICs mounted on said second substrate, said first electrodes including a first drive portion for applying an electric field to said electro-optic layer, a first wiring portion connected to said first drive portion, and an inter-substrate conducting terminal portion connected to said wiring portion, and electrically connected to said first terminals through conductive particles included in said sealing material, said second electrode including a second drive portion for applying an electric field to said electro-optic layer, a second terminal connected to said second drive portion, and a second wiring portion for connecting said second drive portion and said second terminal, said second wiring portion of said second electrode being located on an outer side relative to said first terminals in a direction along one side of said second substrate, said first and said second terminal connected respectively to said corresponding driving ICs, said first terminals extending radially from said corresponding driving IC toward said inter-substrate conducting terminal portion, said wiring portion of said first electrodes extending radially from said inter-substrate conducting terminal portion toward said first drive portion, and said second drive portion, said second terminal of said second electrode, and said first terminals being made of a metallic film having a lower electrical resistance than that of said first electrodes.

13. An electro-optic device according to claim 12, wherein said inter-substrate conducting terminal portion of said first electrodes is connected to an end of said first terminals, and said second wiring portion of said second electrode includes a zone arranged obliquely relative to the end of said first terminals.

14. An electro-optic device according to claim 12, wherein said second wiring portion of said second electrode is arranged so as to bend around a lateral region of said first terminals.

* * * * *